(12) United States Patent
Tang et al.

(10) Patent No.: US 8,508,860 B2
(45) Date of Patent: Aug. 13, 2013

(54) OPTICAL LENS SYSTEM

(75) Inventors: Hsiang Chi Tang, Taichung (TW);
Tsung Han Tsai, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 153 days.

(21) Appl. No.: 13/303,056

(22) Filed: Nov. 22, 2011

(65) Prior Publication Data

US 2012/0087020 A1 Apr. 12, 2012

Related U.S. Application Data

(63) Continuation of application No. 12/980,508, filed on Dec. 29, 2010, now Pat. No. 8,395,851.

(30) Foreign Application Priority Data

Oct. 6, 2010 (TW) .............................. 99133981 A

(51) Int. Cl.
*G02B 13/18* (2006.01)
*G02B 3/02* (2006.01)
*G02B 9/60* (2006.01)

(52) U.S. Cl.
USPC .......................................... 359/714; 359/764

(58) Field of Classification Search
USPC .......................................... 359/708, 764, 714
See application file for complete search history.

(56) References Cited

U.S. PATENT DOCUMENTS

| 7,365,920 | B2 | 4/2008 | Noda |
| 7,826,151 | B2 * | 11/2010 | Tsai .............................. 359/764 |
| 8,072,695 | B1 | 12/2011 | Lee et al. |
| 2010/0214467 | A1 | 8/2010 | Ohtsu |
| 2010/0220229 | A1 | 9/2010 | Sano |
| 2010/0254029 | A1 | 10/2010 | Shinohara |

FOREIGN PATENT DOCUMENTS

CN 201508432 U 6/2010

* cited by examiner

*Primary Examiner* — Scott J Sugarman
(74) *Attorney, Agent, or Firm* — Morris Manning & Martin LLP; Tim Tingkang Xia, Esq.

(57) ABSTRACT

The present invention provides an optical lens system comprising, in order from an object side to an image side: a first lens element with positive refractive power having a convex object-side surface; a second lens element with negative refractive power; a third lens element with positive refractive power having a convex object-side surface and a convex image-side surface; a fourth lens element; and a fifth lens element having a convex object-side surface and a concave image-side surface, the object-side and image-side surfaces thereof being aspheric and at least one inflection point being formed on the image-side surface. Such arrangement of optical elements can effectively minimize the size of the optical lens system, lower the sensitivity of the optical system, and obtain higher image resolution.

27 Claims, 29 Drawing Sheets

| TABLE 1 | | | | | | | |
|---|---|---|---|---|---|---|---|
| (Embodiment 1) | | | | | | | |
| f = 5.97 mm, Fno = 2.60, HFOV = 32.9 deg. | | | | | | | |
| Surface # | | Curvature Radius | Thickness | Material | Index | Abbe # | Focal length |
| 0 | Object | Plano | Infinity | | | | |
| 1 | Lens 1 | 1.90843 (ASP) | 1.012 | Plastic | 1.544 | 55.9 | 3.25 |
| 2 | | -20.00000 (ASP) | 0.043 | | | | |
| 3 | Ape. Stop | Plano | 0.116 | | | | |
| 4 | Lens 2 | -12.88115 (ASP) | 0.300 | Plastic | 1.650 | 21.4 | -4.42 |
| 5 | | 3.73243 (ASP) | 0.268 | | | | |
| 6 | Lens 3 | 16.32622 (ASP) | 0.501 | Plastic | 1.634 | 23.8 | 12.43 |
| 7 | | -15.06406 (ASP) | 0.861 | | | | |
| 8 | Lens 4 | -2.35597 (ASP) | 0.776 | Plastic | 1.530 | 55.8 | 6.64 |
| 9 | | -1.57215 (ASP) | 0.363 | | | | |
| 10 | Lens 5 | -8.50862 (ASP) | 0.814 | Plastic | 1.530 | 55.8 | -3.74 |
| 11 | | 2.66737(ASP) | 0.300 | | | | |
| 12 | IR-filter | Plano | 0.600 | Glass | 1.517 | 64.2 | - |
| 13 | | Plano | 0.560 | | | | |
| 14 | Image | Plano | - | | | | |
| Note : Reference wavelength is d-line 587.6nm | | | | | | | |

Fig.8

| TABLE 2 | | | | | |
|---|---|---|---|---|---|
| Aspheric Coefficients | | | | | |
| Surface # | 1 | 2 | 4 | 5 | 6 |
| k = | 0.00000E+00 | -6.45597E+00 | -1.00000E+00 | 7.97105E+01 | -1.29025E+00 |
| A4 = | -1.66389E-02 | 1.13631E-01 | 2.81933E-02 | 4.52715E-02 | 6.24129E-03 |
| A6 = | -4.94304E-03 | -6.10837E-02 | -4.22722E-03 | -4.92304E-02 | 1.43065E-02 |
| A8 = | 8.35242E-03 | 4.80706E-02 | -1.49953E-02 | 1.40566E-01 | 1.33529E-02 |
| A10 = | -4.93193E-03 | -3.02237E-02 | 2.77071E-02 | -2.32213E-01 | -3.93269E-02 |
| A12 = | 2.81583E-03 | 1.26150E-02 | -2.32695E-02 | 1.83360E-01 | 3.86214E-02 |
| A14 = |  | -2.34297E-03 | 6.74328E-03 | -5.64345E-02 | -1.30672E-02 |
| Surface # | 7 | 8 | 9 | 10 | 11 |
| k = | 0.00000E+00 | 1.30143E+00 | -5.83538E+00 | -1.59625E+02 | -1.26377E+01 |
| A4 = | -4.44180E-02 | -1.96924E-03 | -8.82199E-02 | -3.85611E-02 | -2.97517E-02 |
| A6 = | 1.82148E-02 | 5.59425E-03 | 4.94063E-02 | 4.66286E-03 | 6.07770E-03 |
| A8 = | -2.04966E-02 | -6.01730E-02 | -3.44855E-02 | 8.65942E-04 | -1.07712E-03 |
| A10 = | 2.00344E-02 | 5.62499E-02 | 1.20917E-02 | -2.56162E-04 | 1.04104E-04 |
| A12 = | -5.71641E-03 | -2.33371E-02 | -1.58553E-03 | 2.33029E-05 | -5.25801E-06 |
| A14 = |  | 3.96482E-03 | 3.51398E-05 | -7.62514E-07 | 1.15698E-07 |

Fig.9

| TABLE 3 | | | | | | | |
|---|---|---|---|---|---|---|---|
| (Embodiment 2) | | | | | | | |
| f = 4.18 mm, Fno = 2.85, HFOV = 30.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.100 | | | | |
| 2 | Lens 1 | 1.87015 (ASP) | 0.801 | Plastic | 1.544 | 55.9 | 2.57 |
| 3 | | -4.68498 (ASP) | 0.191 | | | | |
| 4 | Lens 2 | -4.70828 (ASP) | 0.341 | Plastic | 1.634 | 23.8 | -3.77 |
| 5 | | 5.00258 (ASP) | 0.275 | | | | |
| 6 | Lens 3 | 25.00000 (ASP) | 0.402 | Plastic | 1.634 | 23.8 | 26.24 |
| 7 | | -49.41191 (ASP) | 0.203 | | | | |
| 8 | Lens 4 | -2.55467 (ASP) | 0.785 | Plastic | 1.544 | 55.9 | 2.32 |
| 9 | | -0.93639 (ASP) | 0.346 | | | | |
| 10 | Lens 5 | -5.19508 (ASP) | 0.328 | Plastic | 1.530 | 55.8 | -1.98 |
| 11 | | 1.34147 (ASP) | 0.700 | | | | |
| 12 | IR-filter | Plano | 0.200 | Glass | 1.517 | 64.2 | - |
| 13 | | Plano | 0.421 | | | | |
| 14 | Image | Plano | - | | | | |
| Note : Reference wavelength is d-line 587.6nm | | | | | | | |

Fig.10

| TABLE 4 | | | | | |
|---|---|---|---|---|---|
| Aspheric Coefficients | | | | | |
| Surface # | 2 | 3 | 4 | 5 | 6 |
| k = | -1.01926E+01 | -5.80337E-01 | -2.38138E+01 | 1.74769E+01 | -4.01947E+03 |
| A4 = | 1.67129E-01 | -6.95377E-02 | 1.17914E-02 | 5.31619E-02 | -1.00771E-01 |
| A6 = | -2.34639E-01 | -9.18655E-03 | -1.31853E-01 | -4.11947E-02 | -1.25426E-01 |
| A8 = | 2.34793E-01 | -2.64154E-01 | 2.87405E-01 | 1.23103E-01 | 3.92545E-01 |
| A10 = | -2.66465E-01 | 4.46931E-01 | -8.14896E-01 | -3.08244E-01 | -4.57452E-01 |
| A12 = | 1.71550E-01 | -1.93084E-01 | 1.38355E+00 | 3.98272E-01 | 2.22852E-01 |
| A14 = | -1.02422E-01 | -1.27654E-01 | -8.67634E-01 | -1.77061E-01 | |
| Surface # | 7 | 8 | 9 | 10 | 11 |
| k = | -3.67729E+02 | 2.81708E+00 | -3.51553E+00 | -9.74653E+01 | -8.48520E+00 |
| A4 = | -8.76491E-02 | 3.73440E-02 | -7.88445E-02 | -2.76082E-02 | -6.10515E-02 |
| A6 = | -9.49349E-02 | 5.24059E-02 | 1.25201E-01 | -2.81786E-02 | 1.60396E-02 |
| A8 = | 1.40974E-01 | -2.11355E-01 | -1.15377E-01 | 1.25521E-02 | -5.61039E-03 |
| A10 = | -5.97766E-02 | 3.10118E-01 | 6.67340E-02 | -7.62292E-04 | 1.44854E-03 |
| A12 = | 1.64299E-02 | -1.69432E-01 | -1.76631E-02 | -2.11164E-04 | -2.23683E-04 |
| A14 = | | 3.37926E-02 | 1.42882E-03 | 2.00879E-05 | 1.46203E-05 |

Fig.11

| TABLE 5 | | | | | | | |
|---|---|---|---|---|---|---|---|
| (Embodiment 3) | | | | | | | |
| f = 5.96 mm, Fno = 2.66, HFOV= 32.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.86202 (ASP) | 0.921 | Plastic | 1.544 | 55.9 | 3.50 |
| 2 | | 71.42857 (ASP) | 0.093 | | | | |
| 3 | Ape. Stop | Plano | 0.079 | | | | |
| 4 | Lens 2 | -16.33251 (ASP) | 0.300 | Plastic | 1.632 | 23.4 | -5.33 |
| 5 | | 4.27247 (ASP) | 0.302 | | | | |
| 6 | Lens 3 | 53.05818 (ASP) | 0.759 | Plastic | 1.632 | 23.4 | 38.85 |
| 7 | | -45.45455 (ASP) | 0.695 | | | | |
| 8 | Lens 4 | -2.43837 (ASP) | 0.679 | Plastic | 1.544 | 55.9 | 5.68 |
| 9 | | -1.49667 (ASP) | 0.358 | | | | |
| 10 | Lens 5 | 11.85899 (ASP) | 0.720 | Plastic | 1.530 | 55.8 | -4.65 |
| 11 | | 1.99755 (ASP) | 0.500 | | | | |
| 12 | IR-filter | Plano | 0.600 | Glass | 1.517 | 64.2 | - |
| 13 | | Plano | 0.765 | | | | |
| 14 | Image | Plano | - | | | | |
| Note : Reference wavelength is d-line 587.6nm | | | | | | | |

Fig.12

| TABLE 6 | | | | | |
|---|---|---|---|---|---|
| Aspheric Coefficients | | | | | |
| Surface # | 1 | 2 | 4 | 5 | 6 |
| k = | -6.04269E+00 | -1.00000E+00 | 1.49374E+02 | 2.27411E+00 | 0.00000E+00 |
| A4 = | 1.16876E-01 | 1.25397E-02 | 3.67906E-02 | 1.62121E-02 | -4.51742E-02 |
| A6 = | -5.92993E-02 | -4.30279E-03 | -4.76674E-02 | 1.28570E-02 | 1.19679E-02 |
| A8= | 4.79861E-02 | -7.93396E-03 | 1.52524E-01 | 1.46466E-02 | -2.56720E-02 |
| A10= | -3.02454E-02 | 2.54246E-02 | -2.36662E-01 | -3.35884E-02 | 1.96740E-02 |
| A12= | 1.27211E-02 | -2.32696E-02 | 1.83360E-01 | 3.86214E-02 | -5.71645E-03 |
| A14= | -2.34298E-03 | 6.74327E-03 | -5.64345E-02 | -1.30672E-02 | |
| Surface # | 7 | 8 | 9 | 10 | 11 |
| k = | 0.00000E+00 | 1.21188E+00 | -4.86136E+00 | 7.33155E+00 | -7.86030E+00 |
| A4 = | -1.28675E-02 | 1.64381E-02 | -8.40473E-02 | -4.17262E-02 | -3.09142E-02 |
| A6 = | -8.71065E-03 | 8.75823E-03 | 4.85806E-02 | 4.80723E-03 | 6.43571E-03 |
| A8 = | 8.16610E-03 | -5.98349E-02 | -3.46543E-02 | 8.72761E-04 | -1.05026E-03 |
| A10= | -5.24000E-03 | 5.63747E-02 | 1.21117E-02 | -2.56164E-04 | 1.05142E-04 |
| A12= | 1.57583E-03 | -2.33209E-02 | -1.57508E-03 | 2.32646E-05 | -5.28667E-06 |
| A14= | | 3.96073E-03 | 3.67594E-05 | -7.60054E-07 | 1.05324E-07 |

Fig.13

| TABLE 7 | | | | | | | |
|---|---|---|---|---|---|---|---|
| (Embodiment 4) | | | | | | | |
| f = 7.77 mm, Fno = 3.00, HFOV = 24.7 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | 0.100 | | | | |
| 2 | Lens 1 | 3.73302 | 1.245 | Glass | 1.699 | 30.1 | 3.78 |
| 3 | | -7.76898 | 0.010 | | | | |
| 4 | Lens 2 | -7.76898 | 0.972 | Glass | 1.847 | 23.8 | -2.97 |
| 5 | | 3.93149 | 0.231 | | | | |
| 6 | Lens 3 | 5.48567 | 1.300 | Glass | 1.729 | 54.7 | 5.70 |
| 7 | | -15.47289 | 1.267 | | | | |
| 8 | Lens 4 | -1.60829 (ASP) | 1.228 | Plastic | 1.583 | 30.2 | -8.20 |
| 9 | | -3.10455 (ASP) | 0.100 | | | | |
| 10 | Lens 5 | 2.16296 (ASP) | 1.594 | Plastic | 1.514 | 56.8 | 8.66 |
| 11 | | 3.15869 (ASP) | 0.900 | | | | |
| 12 | IR-filter | Plano | 0.750 | Glass | 1.517 | 64.2 | - |
| 13 | | Plano | 1.286 | | | | |
| 14 | Image | Plano | - | | | | |
| Note : Reference wavelength is d-line 587.6nm | | | | | | | |

Fig.14

| TABLE 8 | | | | |
|---|---|---|---|---|
| Aspheric Coefficients | | | | |
| Surface # | 8 | 9 | 10 | 11 |
| k = | -5.05829E-01 | -7.73798E-01 | -3.78126E+00 | -3.37349E+00 |
| A4 = | 7.68326E-02 | 8.59598E-04 | -4.79589E-03 | -3.25427E-03 |
| A6 = | -3.91210E-02 | -4.02754E-03 | -1.45995E-04 | -2.95263E-04 |
| A8= | 1.49968E-02 | 1.14824E-03 | 5.35435E-05 | 3.52525E-05 |
| A10= | -2.73067E-03 | -9.33926E-05 | -4.20266E-06 | -1.53991E-06 |
| A12= | 2.09180E-04 | -4.64638E-07 | 1.08846E-07 | -3.34729E-09 |
| A14= | 1.46256E-07 | 2.26641E-07 | -1.57358E-09 | 1.03135E-09 |

Fig.15

| TABLE 9 | | | | | | |
|---|---|---|---|---|---|---|
| (Embodiment 5) | | | | | | |
| f = 5.99 mm, Fno = 2.60, HFOV= 32.7 deg. | | | | | | |
| Surface # | | Curvature Radius | Thickness | Material | Index | Abbe # | Focal length |
| 0 | Object | Plano | Infinity | | | | |
| 1 | Lens 1 | 1.95504 (ASP) | 0.858 | Plastic | 1.544 | 55.9 | 3.33 |
| 2 | | -20.83333 (ASP) | 0.049 | | | | |
| 3 | Ape. Stop | Plano | 0.102 | | | | |
| 4 | Lens 2 | 10.52632 (ASP) | 0.300 | Plastic | 1.634 | 23.8 | -4.16 |
| 5 | | 2.08453 (ASP) | 0.345 | | | | |
| 6 | Lens 3 | 17.24138 (ASP) | 0.386 | Plastic | 1.632 | 23.4 | 17.07 |
| 7 | | -28.57143 (ASP) | 0.868 | | | | |
| 8 | Lens 4 | -2.37806 (ASP) | 0.709 | Plastic | 1.530 | 55.8 | 6.51 |
| 9 | | -1.55294 (ASP) | 0.336 | | | | |
| 10 | Lens 5 | 13.69786 (ASP) | 0.929 | Plastic | 1.530 | 55.8 | -5.28 |
| 11 | | 2.26758 (ASP) | 0.430 | | | | |
| 12 | IR-filter | Plano | 0.600 | Glass | 1.517 | 64.2 | - |
| 13 | | Plano | 0.837 | | | | |
| 14 | Image | Plano | - | | | | |
| Note : Reference wavelength is d-line 587.6nm | | | | | | | |

Fig.16

| TABLE 10 | | | | | |
|---|---|---|---|---|---|
| Aspheric Coefficients | | | | | |
| Surface # | 1 | 2 | 4 | 5 | 6 |
| k = | -6.72431E+00 | -1.00000E+00 | -4.41316E+02 | -3.70888E+00 | 0.00000E+00 |
| A4 = | 1.14007E-01 | 3.09602E-02 | 1.76473E-02 | -4.94308E-03 | -2.25745E-02 |
| A6 = | -5.94949E-02 | -5.16266E-03 | -6.20463E-02 | 3.43663E-02 | 1.84918E-02 |
| A8 = | 4.90049E-02 | -1.03906E-02 | 1.64560E-01 | 1.25517E-02 | -2.20754E-02 |
| A10 = | -3.09390E-02 | 2.69969E-02 | -2.45121E-01 | -4.29398E-02 | 2.24024E-02 |
| A12 = | 1.33299E-02 | -2.32688E-02 | 1.83368E-01 | 3.86261E-02 | -5.71696E-03 |
| A14 = | -2.34567E-03 | 6.74233E-03 | -5.64345E-02 | -1.30660E-02 | |
| Surface # | 7 | 8 | 9 | 10 | 11 |
| k = | 0.00000E+00 | 1.13235E+00 | -4.81542E+00 | 9.78323E+00 | -8.61568E+00 |
| A4 = | -2.51528E-03 | 2.34865E-02 | -8.31603E-02 | -4.07448E-02 | -3.22872E-02 |
| A6 = | -8.65553E-03 | 8.28795E-03 | 4.93272E-02 | 4.68578E-03 | 6.20067E-03 |
| A8 = | 9.00514E-03 | -5.98871E-02 | -3.45791E-02 | 8.69728E-04 | -1.05063E-03 |
| A10 = | -4.20180E-03 | 5.62668E-02 | 1.20600E-02 | -2.56140E-04 | 1.05504E-04 |
| A12 = | 2.30548E-03 | -2.32865E-02 | -1.58734E-03 | 2.33152E-05 | -5.24202E-06 |
| A14 = | | 3.99138E-03 | 3.73609E-05 | -7.60242E-07 | 1.05715E-07 |

Fig.17

| TABLE 11 | | | | | | | |
|---|---|---|---|---|---|---|---|
| (Embodiment 6) | | | | | | | |
| f = 5.77 mm, Fno = 2.90, HFOV = 31.3 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.300 | | | | |
| 2 | Lens 1 | 1.57249 (ASP) | 0.587 | Plastic | 1.544 | 55.9 | 3.54 |
| 3 | | 7.46270 (ASP) | 0.120 | | | | |
| 4 | Lens 2 | 12.52440 (ASP) | 0.280 | Plastic | 1.634 | 23.8 | -5.99 |
| 5 | | 2.88945 (ASP) | 0.446 | | | | |
| 6 | Lens 3 | 8.77190 (ASP) | 0.367 | Plastic | 1.634 | 23.8 | 8.52 |
| 7 | | -13.81220 (ASP) | 0.428 | | | | |
| 8 | Lens 4 | -1.43135 (ASP) | 0.678 | Plastic | 1.544 | 55.9 | -26.74 |
| 9 | | -1.85247 (ASP) | 0.710 | | | | |
| 10 | Lens 5 | 2.49539 (ASP) | 0.519 | Plastic | 1.544 | 55.9 | -14.82 |
| 11 | | 1.76590 (ASP) | 1.000 | | | | |
| 12 | IR-filter | Plano | 0.300 | Glass | 1.517 | 64.2 | - |
| 13 | | Plano | 0.421 | | | | |
| 14 | Image | Plano | - | | | | |
| Note : Reference wavelength is d-line 587.6nm | | | | | | | |

Fig.18

| TABLE 12 | | | | | |
|---|---|---|---|---|---|
| Aspheric Coefficients | | | | | |
| Surface # | 2 | 3 | 4 | 5 | 6 |
| k = | 3.00715E-01 | -1.00000E+00 | -1.00000E+00 | 5.74469E+00 | -1.00000E+00 |
| A4 = | -1.36010E-02 | -4.82768E-02 | -4.89104E-02 | -3.42694E-02 | -6.96516E-02 |
| A6 = | 1.88677E-03 | 9.88166E-03 | 6.93453E-02 | 5.86640E-02 | -6.48466E-03 |
| A8= | -3.00843E-02 | -1.07830E-02 | -2.50560E-02 | -3.27558E-02 | -4.55182E-02 |
| A10= | 3.03026E-02 | -6.27845E-03 | 2.49098E-02 | 5.52035E-02 | 1.90496E-02 |
| A12= | -2.86623E-02 | | | | -1.10116E-03 |
| A14= | | | | | 4.26036E-03 |
| A16= | | | | | -8.35665E-04 |
| Surface # | 7 | 8 | 9 | 10 | 11 |
| k = | -1.00000E+00 | -1.00000E+00 | -1.00000E+00 | -2.82242E+00 | -4.48677E+00 |
| A4 = | 4.91329E-04 | 1.62369E-01 | 1.08237E-01 | -5.36878E-02 | -4.21203E-02 |
| A6 = | -3.74303E-02 | -3.90923E-02 | -1.99190E-02 | 1.15354E-02 | 9.55421E-03 |
| A8 = | 2.26693E-02 | -3.40997E-03 | 1.73036E-03 | -1.33549E-03 | -1.62818E-03 |
| A10= | -9.02333E-03 | 9.93691E-03 | -7.54713E-04 | 3.83965E-05 | 1.53762E-04 |
| A12= | | -5.38061E-03 | 9.42030E-05 | | -7.77834E-06 |

Fig.19

| TABLE 13 | | | | | | | |
|---|---|---|---|---|---|---|---|
| (Embodiment 7) | | | | | | | |
| f = 5.68 mm, Fno = 2.90, HFOV = 31.8 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.310 | | | | |
| 2 | Lens 1 | 1.56716 (ASP) | 0.651 | Plastic | 1.544 | 55.9 | 3.54 |
| 3 | | 7.15810 (ASP) | 0.202 | | | | |
| 4 | Lens 2 | -9.16410 (ASP) | 0.310 | Plastic | 1.650 | 21.4 | -5.71 |
| 5 | | 6.31100 (ASP) | 0.338 | | | | |
| 6 | Lens 3 | 6.55740 (ASP) | 0.404 | Plastic | 1.634 | 23.8 | 7.07 |
| 7 | | -13.81220 (ASP) | 0.480 | | | | |
| 8 | Lens 4 | -1.46359 (ASP) | 0.415 | Plastic | 1.544 | 55.9 | -6.73 |
| 9 | | -2.68137 (ASP) | 0.538 | | | | |
| 10 | Lens 5 | 2.81014 (ASP) | 0.891 | Plastic | 1.544 | 55.9 | 65.64 |
| 11 | | 2.70932 (ASP) | 1.000 | | | | |
| 12 | IR-filter | Plano | 0.300 | Glass | 1.517 | 64.2 | - |
| 13 | | Plano | 0.505 | | | | |
| 14 | Image | Plano | - | | | | |
| Note : Reference wavelength is d-line 587.6nm | | | | | | | |

Fig.20

| TABLE 14 | | | | | |
|---|---|---|---|---|---|
| Aspheric Coefficients | | | | | |
| Surface # | 2 | 3 | 4 | 5 | 6 |
| k  = | 3.14989E-01 | -1.00000E+00 | -1.00000E+00 | 7.47792E+00 | -1.00000E+00 |
| A4 = | -1.45943E-02 | -4.36246E-02 | -3.46750E-02 | -7.24921E-03 | -7.30989E-02 |
| A6 = | 2.51229E-03 | 5.06206E-03 | 8.12954E-02 | 8.78318E-02 | -7.18434E-03 |
| A8= | -2.76427E-02 | -6.45944E-03 | -2.40776E-02 | -3.36780E-02 | -3.41401E-02 |
| A10= | 2.93304E-02 | -7.02871E-03 | 1.17393E-02 | 6.84131E-02 | 2.94471E-02 |
| A12= | -2.40643E-02 | | | | -1.32433E-03 |
| A14= | | | | | 4.21431E-03 |
| A16= | | | | | -8.61338E-04 |
| Surface # | 7 | 8 | 9 | 10 | 11 |
| k  = | -1.00000E+00 | -1.00000E+00 | -1.00000E+00 | -3.94297E+00 | -3.00249E+00 |
| A4 = | -9.14692E-03 | 1.58108E-01 | 9.64363E-02 | -5.40712E-02 | -4.85344E-02 |
| A6 = | -3.27688E-02 | -4.56864E-02 | -2.04114E-02 | 1.13895E-02 | 9.57948E-03 |
| A8 = | 2.45302E-02 | -3.04393E-03 | 1.52333E-03 | -1.36312E-03 | -1.60658E-03 |
| A10= | -6.40856E-03 | 1.13814E-02 | -7.82809E-04 | 4.08467E-05 | 1.56077E-04 |
| A12= | | -5.44455E-03 | 1.23183E-04 | | -7.98217E-06 |

Fig.21

TABLE 15

| | Embodiment 1 | Embodiment 2 | Embodiment 3 | Embodiment 4 | Embodiment 5 | Embodiment 6 | Embodiment 7 |
|---|---|---|---|---|---|---|---|
| f | 5.97 | 4.18 | 5.96 | 7.77 | 5.99 | 5.77 | 5.68 |
| Fno | 2.60 | 2.85 | 2.66 | 3.00 | 2.60 | 2.90 | 2.90 |
| HFOV | 32.9 | 30.4 | 32.5 | 24.7 | 32.7 | 31.3 | 31.8 |
| V1-V2 | 34.5 | 32.0 | 32.5 | 6.3 | 32.1 | 32.0 | 34.5 |
| \|V2-V3\| | 2.46 | 0.00 | 0.00 | 30.90 | 0.41 | 0.00 | 2.46 |
| CT2/f | 0.05 | 0.08 | 0.05 | 0.13 | 0.05 | 0.05 | 0.05 |
| R1/R2 | -0.10 | -0.40 | 0.03 | -0.48 | -0.09 | 0.21 | 0.22 |
| \|R10/R9\| | 0.31 | 0.26 | 0.17 | 1.46 | 0.17 | 0.71 | 0.96 |
| \|(R7+R8)/(R7-R8)\| | 5.01 | 2.16 | 4.18 | 3.15 | 4.76 | 7.80 | 3.40 |
| f/f1 | 1.84 | 1.63 | 1.70 | 2.06 | 1.80 | 1.63 | 1.60 |
| f/f3 | 0.48 | 0.16 | 0.15 | 1.36 | 0.35 | 0.68 | 0.80 |
| \|f4/f5\| | 1.78 | 1.17 | 1.22 | 0.95 | 1.23 | 1.80 | 0.10 |
| \|f/f3+f/f4+f/f5\| | 0.22 | 0.15 | 0.08 | 1.31 | 0.14 | 0.07 | 0.05 |
| SL/TTL | 0.83 | 0.98 | 0.85 | 1.01 | 0.86 | 0.95 | 0.95 |
| TTL/ImgH | 1.63 | 1.97 | 1.70 | 2.95 | 1.69 | 1.71 | 1.68 |

Fig. 22

OPTICAL LENS SYSTEM

CROSS REFERENCES TO THE RELATED APPLICATIONS

This is a Continuation Application of U.S. application Ser. No. 12/980,508, filed on Dec. 29, 2010, now pending, which itself claims priority under 35 U.S.C. §119(a) on Patent Application No. 099133981 filed in Taiwan, R.O.C. on Oct. 6, 2010, the entire contents of which are hereby incorporated by reference.

BACKGROUND OF THE INVENTION

1. Field of the Invention

The present invention relates to an optical lens system, and more particularly, to a compact optical lens system used in a portable electronic product.

2. Description of the Prior Art

In recent years, due to the popularity of portable electronic products with photographing functions, the demand for a compact imaging lens system is increasing, and the sensor of a general photographing camera is none other than CCD (Charge-coupled Device) or CMOS device (Complementary Metal-oxide-semiconductor Device). Furthermore, as advances in semiconductor manufacturing technology have allowed the pixel size of sensors to be reduced, and the resolution of a compact imaging lens system has gradually increased, there is an increasing demand for a compact imaging lens system featuring better image quality.

A conventional compact imaging lens system used in a portable electronic product generally comprises four lens elements, such as the one disclosed in U.S. Pat. No. 7,365,920. However, as smartphones, PDAs or other high-end mobile devices are gaining popularity, the demand for a compact imaging lens system which features even more pixels and even better image quality is also rising. A conventional lens system comprising four lens elements became insufficient for high-end imaging modules; meanwhile, electronic products are becoming more and more powerful yet featuring a compact design. Therefore, there is an increasing demand for an optical lens system which can be used in portable, compact electronic products with higher image quality while having a moderate total track length.

Therefore, a need exists in the art for an optical lens system featuring a simple manufacturing process and better image quality.

SUMMARY OF THE INVENTION

The present invention provides an optical lens system comprising, in order from an object side to an image side: a first lens element with positive refractive power having a convex object-side surface; a second lens element with negative refractive power; a third lens element with positive refractive power having a convex object-side surface and a convex image-side surface; a fourth lens element; and a fifth lens element having a convex object-side surface and a concave image-side surface, the object-side and image-side surfaces thereof being aspheric and at least one inflection point being formed on the image-side surface, wherein the optical lens system is further provided with a stop disposed between an object and the third lens element, and an electronic sensor disposed at an image plane for the image formation of the object; a focal length of the optical lens system is f; a focal length of the third lens element is f3; a distance on an optical axis between the stop and the electronic sensor is SL; a distance on the optical axis between the object-side surface of the first lens element and the electronic sensor is TTL; and they satisfy the following relations: $0.00<f/f3<1.90$, and $0.7<SL/TTL<1.2$.

Moreover, the present invention provides an optical lens system comprising, in order from an object side to an image side: a first lens element with positive refractive power having a convex object-side surface; a second lens element with negative refractive power; a third lens element with positive refractive power having a convex object-side surface and a convex image-side surface; a fourth lens element with positive refractive power; and a fifth lens element with negative refractive power having a convex object-side surface and a concave image-side surface, both of the object-side and image-side surfaces thereof being aspheric and at least one inflection point being formed on the image-side surface, wherein the optical lens system is further provided with a stop disposed between an object and the third lens element, and an electronic sensor disposed at an image plane for the image formation of the object; a focal length of the optical lens system is f; a focal length of the first lens element is f1; a distance on an optical axis between the stop and the electronic sensor is SL; a distance on the optical axis between the object-side surface of the first lens element and the electronic sensor is TTL; and they satisfy the following relations: $1.00<f/f1<2.30$, and $0.7<SL/TTL<1.2$.

Such arrangement of optical elements can effectively minimize the size of the optical lens system, lower the sensitivity of the optical system, and obtain higher image resolution.

In an optical lens system of the present invention, the first lens element with positive refractive power provides the positive refractive power of the optical lens system; this allows the total track length of the optical lens system to be favorably reduced. The second lens element has negative refractive power; this allows aberrations produced by the first lens element, as well as chromatic aberrations of the optical lens system, to be effectively corrected. The third lens element with positive refractive power effectively distributes the refractive power of the first lens element, thereby reducing the sensitivity of the optical lens system. The fourth lens element and the fifth lens element may have positive or negative refractive power. When the fourth lens element has positive and the fifth lens element has negative refractive power, they will form a telephoto structure with one positive and one negative refractive power. This allows the back focal length of the optical lens system to be favorably reduced, thereby reducing the total track length.

In an optical lens system of the present invention, the first lens element may be a bi-convex lens element or a meniscus lens element having a convex object-side surface and a concave image-side surface. When the first lens element is a bi-convex lens element, the refractive power of the first lens element can be effectively distributed, thereby reducing the total track length of the optical lens system. When the first lens element is a meniscus lens element, the astigmatism of the optical lens system can be favorably corrected. The second lens element has a concave object-side surface; this allows the back focal length of the optical lens system to be extended favorably, so that there will be sufficient space to accommodate other components in the optical lens system. Preferably, the second lens element has a concave object-side surface and a concave image-side surface; this allows the Petzval sum of the optical lens system to be effectively corrected, and moreover, the back focal length of the optical lens system can be extended favorably to have sufficient space for accommodating other components in the optical lens system. The third lens element has a convex object-side surface and a convex image-side surface; this enhances the positive refractive power of the third lens element so that the refractive power of the first lens element can be effectively distributed, thereby reducing the total track length and lowering the sensitivity of the optical lens system. The fourth lens element may have a concave object-side surface and a convex image-side surface; this allows the astigmatism of the optical lens system to be corrected favorably. The fifth lens element has a concave image-side surface; this allows the principal point of the optical lens system to be placed away from the image plane, thereby reducing the total track length favorably and minimizing the optical lens system.

In an optical lens system of the present invention, the stop may be disposed between the object and the first lens element, between the first lens element and the second lens element, or between the second lens element and the third lens element. With the first lens element providing positive refractive power and by placing the stop close to the object, the total track length of the optical lens system can be effectively reduced. The aforementioned arrangement also enables the exit pupil of the optical lens system to be positioned far away from the image plane; thus, light will be projected onto the electronic sensor at a nearly perpendicular angle, and this is the telecentric feature of the image side. The telecentric feature is very important to the photosensitive ability of the current solid-state sensor because it can improve the photosensitivity of the sensor to reduce the probability of shading occurrences. In addition, the image-side surface of the fifth lens element can be provided with an inflection point; as a result, the angle at which light is projected onto the sensor from the off-axis field can be effectively reduced, thereby further correcting the off-axis aberrations. Moreover, when the stop is disposed closer to the third lens element, a wide field of view can be favorably achieved. Such arrangement of the stop can facilitate the correction of distortions and chromatic aberrations of magnification, as well as reduce the sensitivity of the optical lens system effectively.

Therefore, in an optical lens system of the present invention, the stop is disposed between the object and the third lens element for the purpose of achieving a good balance between the telecentric feature and a wide field of view.

BRIEF DESCRIPTION OF THE DRAWINGS

FIG. 8 is TABLE 1 which lists the optical data of the first embodiment.

FIG. 9 is TABLE 2 which lists the aspheric surface data of the first embodiment.

FIG. 10 is TABLE 3 which lists the optical data of the second embodiment.

FIG. 11 is TABLE 4 which lists the aspheric surface data of the second embodiment.

FIG. 12 is TABLE 5 which lists the optical data of the third embodiment.

FIG. 13 is TABLE 6 which lists the aspheric surface data of the third embodiment.

FIG. 14 is TABLE 7 which lists the optical data of the fourth embodiment.

FIG. 15 is TABLE 8 which lists the aspheric surface data of the fourth embodiment.

FIG. 16 is TABLE 9 which lists the optical data of the fifth embodiment.

FIG. 17 is TABLE 10 which lists the aspheric surface data of the fifth embodiment.

FIG. 18 is TABLE 11 which lists the optical data of the sixth embodiment.

FIG. 19 is TABLE 12 which lists the aspheric surface data of the sixth embodiment.

FIG. 20 is TABLE 13 which lists the optical data of the seventh embodiment.

FIG. 21 is TABLE 14 which lists the aspheric surface data of the seventh embodiment.

FIG. 22 is TABLE 15 which lists the data of the respective embodiments resulting from the equations.

DETAILED DESCRIPTION OF THE PREFERRED EMBODIMENTS

Figure 1A:
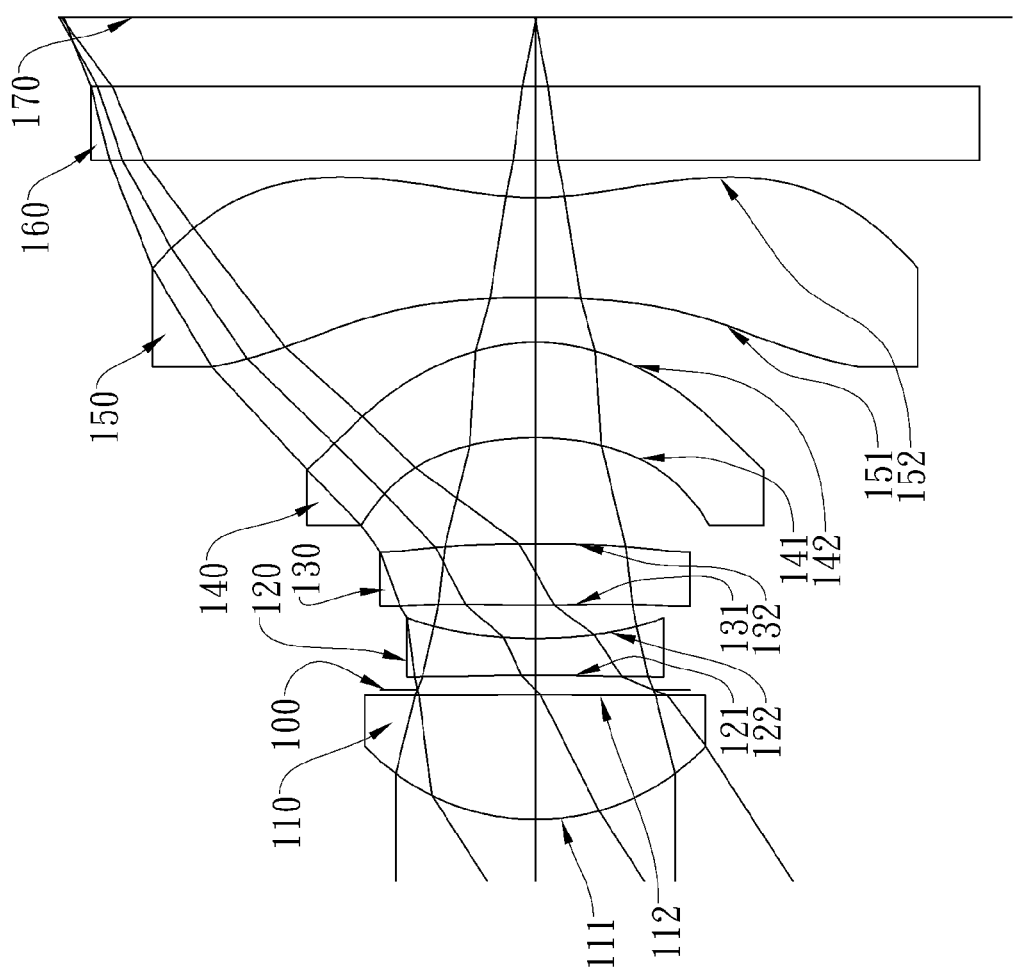
FIG. 1A shows an optical lens system in accordance with a first embodiment of the present invention.

The present invention provides an optical lens system comprising, in order from an object side to an image side: a first lens element with positive refractive power having a convex object-side surface; a second lens element with negative refractive power; a third lens element with positive refractive power having a convex object-side surface and a convex image-side surface; a fourth lens element; and a fifth lens element having a convex object-side surface and a concave image-side surface, the object-side and image-side surfaces thereof being aspheric and at least one inflection point being formed on the image-side surface. The optical lens system is further provided with a stop disposed between an object and the third lens element, and an electronic sensor disposed at an image plane for the image formation of the object; a focal length of the optical lens system is f; a focal length of the third lens element is f3; a distance on an optical axis between the stop and the electronic sensor is SL; a distance on the optical axis between the object-side surface of the first lens element and the electronic sensor is TTL; and they satisfy the following relations: $0.00 < f/f3 < 1.90$, and $0.7 < SL/TTL < 1.2$.

When the relation of $0.00 < f/f3 < 1.90$ is satisfied, the refractive power of the third lens element is more appropriate, and the positive refractive power of the first lens element can be effectively distributed, thereby reducing the sensitivity of the optical lens system. Preferably, the following relation is satisfied: $0.00 < f/f3 < 0.80$.

When the relation of 0.7<SL/TTL<1.2 is satisfied, a good balance between the telecentric feature and a wide field of view of the optical lens system can be favorably achieved.

In the aforementioned optical lens system, preferably, the fourth lens element has a concave object-side surface and a convex image-side surface; this allows the astigmatism of the optical lens system to be favorably corrected. Preferably, at least one of the object-side and image-side surfaces of the fourth lens element is aspheric, which can correct different types of aberrations within the optical lens system. Furthermore, the fifth lens element is made of plastic which can reduce the total weight and cost of the optical lens system.

In the aforementioned optical lens system, preferably, the second lens element has a concave image-side surface; this allows the back focal length of the optical lens system to be extended favorably, so that there will be sufficient space to accommodate other components in the optical lens system. Preferably, the second lens element has a concave object-side surface; this allows the Petzval sum of the optical lens system to be effectively corrected, and moreover, the back focal length of the optical lens system can be extended favorably to have sufficient space for accommodating other components in the optical lens system.

In the aforementioned optical lens system, the focal length of the optical lens system is f, a focal length of the first lens element is f1, and preferably, they satisfy the following relation: 1.00<f/f1<2.30. When this relation is satisfied, the refractive power of the first lens element can be distributed in a more balanced manner; this allows the total track length of the optical lens system to be effectively controlled and prevents high order spherical aberrations from increasing excessively while improving image quality of the optical lens system. Preferably, the following relation is satisfied: 1.30<f/f1<2.00.

In the aforementioned optical lens system, an Abbe number of the first lens element is V1, an Abbe number of the second lens element is V2, and preferably, they satisfy the following relation: 28.0<V1−V2<42.0. When this relation is satisfied, chromatic aberrations of the optical lens system can be favorably corrected.

In the aforementioned optical lens system, an Abbe number of the second lens element is V2, an Abbe number of the third lens element is V3, and preferably, they satisfy the following relation: |V2−V3|<12.0. When this relation is satisfied, the optical lens system's ability to correct chromatic aberrations can be favorably improved.

In the aforementioned optical lens system, a thickness of the second lens element on the optical axis is CT2, the focal length of the optical lens system is f, and preferably, they satisfy the following relation: 0.02<CT2/f<0.15. When this relation is satisfied, the thickness of the second lens element is more favorable. As a result, higher manufacturing efficiency can be obtained during the lens production process, and the yield rate can be improved; also, the lens elements can be formed more easily with a higher homogeneity.

In the aforementioned optical lens system, a radius of curvature of the object-side surface of the first lens element is R1, a radius of curvature of the image-side surface of the first lens element is R2, and preferably, they satisfy the following relation: −0.80<R1/R2<0.50. When this relation is satisfied, spherical aberrations of the optical lens system can be favorably corrected; moreover, the first lens element can help reducing the total track length of the optical lens system, thereby allowing the system to be effectively minimized.

In the aforementioned optical lens system, a radius of curvature of the object-side surface of the fifth lens element is R9, a radius of curvature of the image-side surface of the fifth lens element is R10, and they satisfy the following relation: |R10/R9|<1.3. When this relation is satisfied, the principal point of the optical lens system can be placed away from the image plane, thereby reducing the total track length favorably and minimizing the optical lens system. Preferably, the following relation is satisfied, |R10/R9|<0.8.

In the aforementioned optical lens system, the focal length of the optical lens system is f, the focal length of the third lens element is f3, a focal length of the fourth lens element is f4, a focal length of the fifth lens element is f5, and preferably, they satisfy the following relation: |(f/f3)+(f/f4)+(f/f5)|<0.5. When this relation is satisfied, the refractive power of the third, fourth and fifth lens elements can be distributed in a more balanced manner, thereby reducing the sensitivity and aberrations of the optical lens system favorably.

In the aforementioned optical lens system, the distance on the optical axis between the stop and the electronic sensor is SL, the distance on the optical axis between the object-side surface of the first lens element and the electronic sensor is TTL, and preferably, they satisfy the following relation: 0.8<SL/TTL<0.98. When this relation is satisfied, a good balance between the telecentric feature and a wide field of view of the optical lens system can be favorably achieved.

In the aforementioned optical lens system, the distance on the optical axis between the object-side surface of the first lens element and the electronic sensor is TTL, half of a diagonal length of an effective pixel area of the electronic sensor is ImgH, and preferably, they satisfy the following relation: TTL/ImgH<2.10. When this relation is satisfied, the optical lens system can maintain a compact size which is favorable for the installation into a compact electronic product.

Moreover, the present invention provides an optical lens system comprising, in order from an object side to an image side: a first lens element with positive refractive power having a convex object-side surface; a second lens element with negative refractive power; a third lens element with positive refractive power having a convex object-side surface and a convex image-side surface; a fourth lens element with positive refractive power; and a fifth lens element with negative refractive power having a convex object-side surface and a concave image-side surface, both of the object-side and image-side surfaces thereof being aspheric and at least one inflection point being formed on the image-side surface. The optical lens system is further provided with a stop disposed between an object and the third lens element, and an electronic sensor disposed at an image plane for the image formation of the object; a focal length of the optical lens system is f; a focal length of the first lens element is f1; a distance on an optical axis between the stop and the electronic sensor is SL; a distance on the optical axis between the object-side surface of the first lens element and the electronic sensor is TTL; and they satisfy the following relations: 1.00<f/f1<2.30, and 0.7<SL/TTL<1.2.

When the relation of 1.00<f/f1<2.30 is satisfied, the total track length of the optical lens system can be effectively controlled; also, excessive increase of high order spherical aberrations can be avoided, thereby improving image quality of the optical lens system. Preferably, the following relation is satisfied: 1.30<f/f1<2.00.

When the relation of 0.7<SL/TTL<1.2 is satisfied, a good balance between the telecentric feature and a wide field of view of the optical lens system can be favorably achieved.

In the aforementioned optical lens system, preferably, the second lens element has a concave object-side surface and a concave image-side surface; this allows the Petzval sum of the optical lens system to be effectively corrected, and moreover, the back focal length of the optical lens system can be extended favorably to have sufficient space for accommodating other components in the optical lens system.

In the aforementioned optical lens system, preferably, the fourth lens element has a concave image-side surface and a convex image-side surface; this allows the astigmatism of the optical lens system to be favorably corrected. Preferably, at least one of the object-side and image-side surfaces of the fourth lens element is aspheric, and the fifth lens element is made of plastic.

In the aforementioned optical lens system, the focal length of the optical lens system is f, a focal length of the third lens element is f3, and preferably, they satisfy the following relation: 0.00<f/f3<0.80. When this relation is satisfied, the refractive power of the third lens element is more appropriate, and the positive refractive power of the first lens element can be effectively distributed, thereby reducing the sensitivity of the optical lens system.

In the aforementioned optical lens system, an Abbe number of the first lens element is V1, an Abbe number of the second lens element is V2, and preferably, they satisfy the following relation: 28.0<V1−V2<42.0. When this relation is satisfied, chromatic aberrations of the optical lens system can be favorably corrected.

In the aforementioned optical lens system, a focal length of the fourth lens element is f4, a focal length of the fifth lens element is f5, and preferably, they satisfy the following relation: 0.4<|f4/f5|<1.6. When this relation is satisfied, the refractive power of the fourth and fifth lens elements can be distributed in a more balanced manner, thereby correcting high order aberrations effectively and improving the resolution of the optical lens system.

In the aforementioned optical lens system, the focal length of the optical lens system is f, the focal length of the third lens element is f3, the focal length of the fourth lens element is f4, the focal length of the fifth lens element is f5, and preferably, they satisfy the following relation: |(f/f3)+(f/f4)+(f/f5)|<0.5. When this relation is satisfied, the refractive power of the third, fourth and fifth lens elements can be distributed in a more balanced manner, thereby reducing the sensitivity and aberrations of the optical lens system favorably.

In the aforementioned optical lens system, the distance on the optical axis between the stop and the electronic sensor is SL, the distance on the optical axis between the object-side surface of the first lens element and the electronic sensor is TTL, and preferably, they satisfy the following relation: 0.8<SL/TTL<0.98. When this relation is satisfied, a good balance between the telecentric feature and a wide field of view of the optical lens system can be favorably achieved.

In the aforementioned optical lens system, a radius of curvature of the object-side surface of the fifth lens element is R9, a radius of curvature of the image-side surface of the fifth lens element is R10, and preferably, they satisfy the following relation: |R10/R9|<0.8. When this relation is satisfied, the principal point of the optical lens system can be placed away from the image plane, thereby reducing the total track length favorably and minimizing the optical lens system.

In the aforementioned optical lens system, the distance on the optical axis between the object-side surface of the first lens element and the electronic sensor is TTL, half of a diagonal length of an effective pixel area of the electronic sensor is ImgH, and preferably, they satisfy the following relation: TTL/ImgH<2.10. When this relation is satisfied, the optical lens system can maintain a compact size which is favorable for the installation into a compact electronic product.

In the aforementioned optical lens system, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the assembly can be reduced effectively.

In the aforementioned optical lens system, if a lens element has a convex surface, it means the portion of the surface in proximity to the axis is convex; if a lens element has a concave surface, it means the portion of the surface in proximity to the axis is concave.

Additionally, if necessary, at least one or more stops can be placed within the aforementioned optical lens system to eliminate the occurrence of unwanted rays (such as flare stops), to adjust the field of view (such as field stops), or for other means to improve the image quality.

Preferred embodiments of the present invention will be described in the following paragraphs by referring to the accompanying drawings.

Figure 1B:
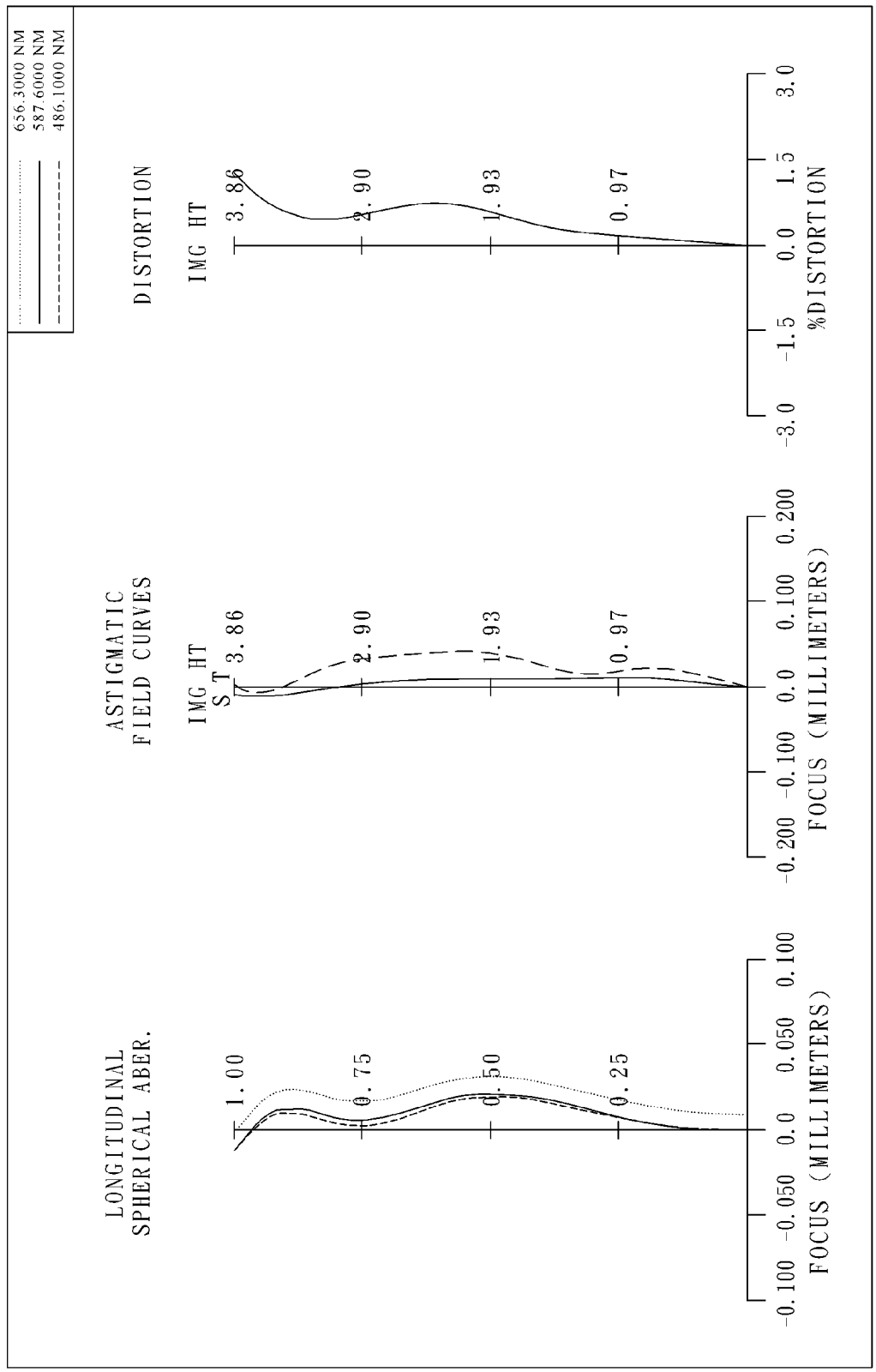
FIG. 1B shows the aberration curves of the first embodiment of the present invention.

FIG. 1A shows an optical lens system in accordance with a first embodiment of the present invention, and FIG. 1B shows the aberration curves of the first embodiment of the present invention. The optical lens system in the first embodiment mainly comprises five lens elements, in order from an object side to an image side: a plastic first lens element 110 with positive refractive power having a convex object-side surface 111 and a convex image-side surface 112, both of the surfaces 111 and 112 being aspheric; a plastic second lens element 120 with negative refractive power having a concave object-side surface 121 and a concave image-side surface 122, both of the surfaces 121 and 122 being aspheric; a plastic third lens element 130 with positive refractive power having a convex object-side surface 131 and a convex image-side surface 132, both of the surfaces 131 and 132 being aspheric; a plastic fourth lens element 140 with positive refractive power having a concave object-side surface 141 and a convex image-side surface 142, both of the surfaces 141 and 142 being aspheric with at least one inflection point being formed on each of them; a plastic fifth lens element 150 with negative refractive power having a concave object-side surface 151 and a concave image-side surface 152, both of the surfaces 151 and 152 being aspheric and at least one inflection point being formed on the image-side surface 152; and a stop 100 disposed between the first lens element 110 and the second lens element 120. The optical lens system further comprises an IR-filter 160 disposed between the image-side surface 152 of the fifth lens element 150 and an image plane 170. The IR-filter 160 is made of glass and has no influence on the focal length of the optical lens system. Moreover, an electronic sensor is disposed at the image plane 170 for image formation of an object.

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical lens system, the focal length of the optical lens system is f, and it satisfies the relation: f=5.97 (mm).

In the first embodiment of the present optical lens system, the f-number of the optical lens system is Fno, and it satisfies the relation: Fno=2.60.

In the first embodiment of the present optical lens system, half of the maximum field of view of the optical lens system is HFOV, and it satisfies the relation: HFOV=32.9 (degrees).

In the first embodiment of the present optical lens system, the Abbe number of the first lens element 110 is V1, the Abbe number of the second lens element 120 is V2, and they satisfy the relation: V1−V2=34.5.

In the first embodiment of the present optical lens system, the Abbe number of the second lens element 120 is V2, the Abbe number of the third lens element 130 is V3, and they satisfy the relation: |V2−V3|=2.46.

In the first embodiment of the present optical lens system, the thickness of the second lens element 120 on the optical axis is CT2, the focal length of the optical lens system is f, and they satisfy the following relation: CT2/f=0.05.

In the first embodiment of the present optical lens system, the radius of curvature of the object-side surface 111 of the first lens element 110 is R1, the radius of curvature of the image-side surface 112 of the first lens element 110 is R2, and they satisfy the relation: R1/R2=−0.10.

In the first embodiment of the present optical lens system, the radius of curvature of the object-side surface 151 of the fifth lens element 150 is R9, the radius of curvature of the image-side surface 152 of the fifth lens element 150 is R10, and they satisfy the relation: |R10/R9|=0.31.

In the first embodiment of the present optical lens system, the radius of curvature of the object-side surface 141 of the fourth lens element 140 is R7, the radius of curvature of the image-side surface 142 of the fourth lens element 140 is R8, and they satisfy the relation: |(R7+R8)/(R7−R8)|=5.01.

In the first embodiment of the present optical lens system, the focal length of the optical lens system is f, the focal length of the first lens element 110 is f1, and they satisfy the relation: f/f1=1.84.

In the first embodiment of the present optical lens system, the focal length of the optical lens system is f, the focal length of the third lens element 130 is f3, and they satisfy the relation: f/f3=0.48.

In the first embodiment of the present optical lens system, the focal length of the fourth lens element 140 is f4, the focal length of the fifth lens element 150 is f5, and they satisfy the relation: |f4/f5|=1.78.

In the first embodiment of the present optical lens system, the focal length of the optical lens system is f, the focal length of the third lens element 130 is f3, the focal length of the fourth lens element 140 is f4, the focal length of the fifth lens element 150 is f5, and they satisfy the relation: |(f/f3)+(f/f4)+(f/f5)|=0.22.

In the first embodiment of the present optical lens system, the distance on the optical axis between the stop 100 and the electronic sensor is SL, the distance on the optical axis between the object-side surface 111 of the first lens element 110 and the electronic sensor is TTL, and they satisfy the relation: SL/TTL=0.83.

In the first embodiment of the present optical lens system, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.63.

The detailed optical data of the first embodiment is shown in FIG. 8 (TABLE 1), and the aspheric surface data is shown in FIG. 9 (TABLE 2), wherein the units of the radius of curvature, the thickness and the focal length are expressed in mm, and HFOV is half of the maximum field of view.

Figure 2A:
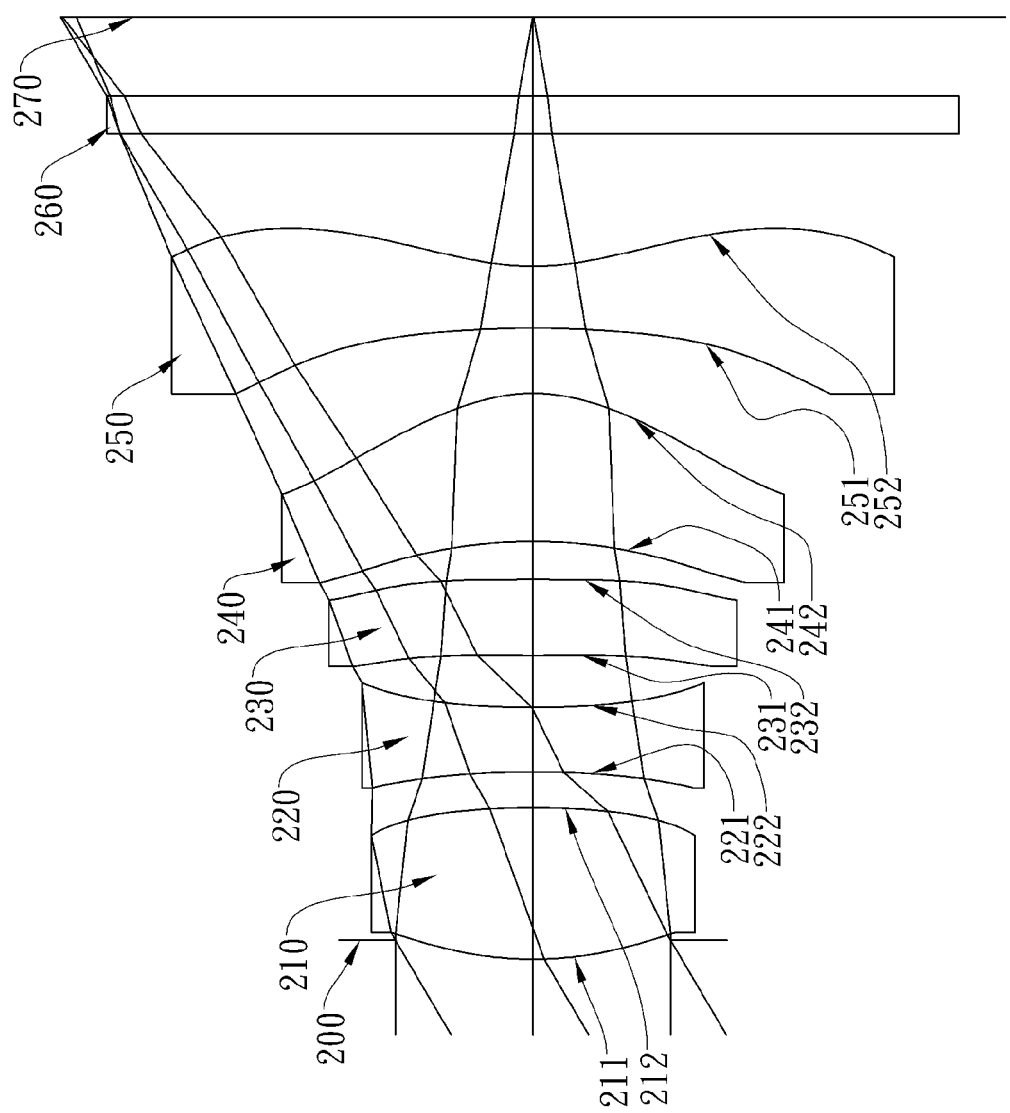
FIG. 2A shows an optical lens system in accordance with a second embodiment of the present invention.
Figure 2B:
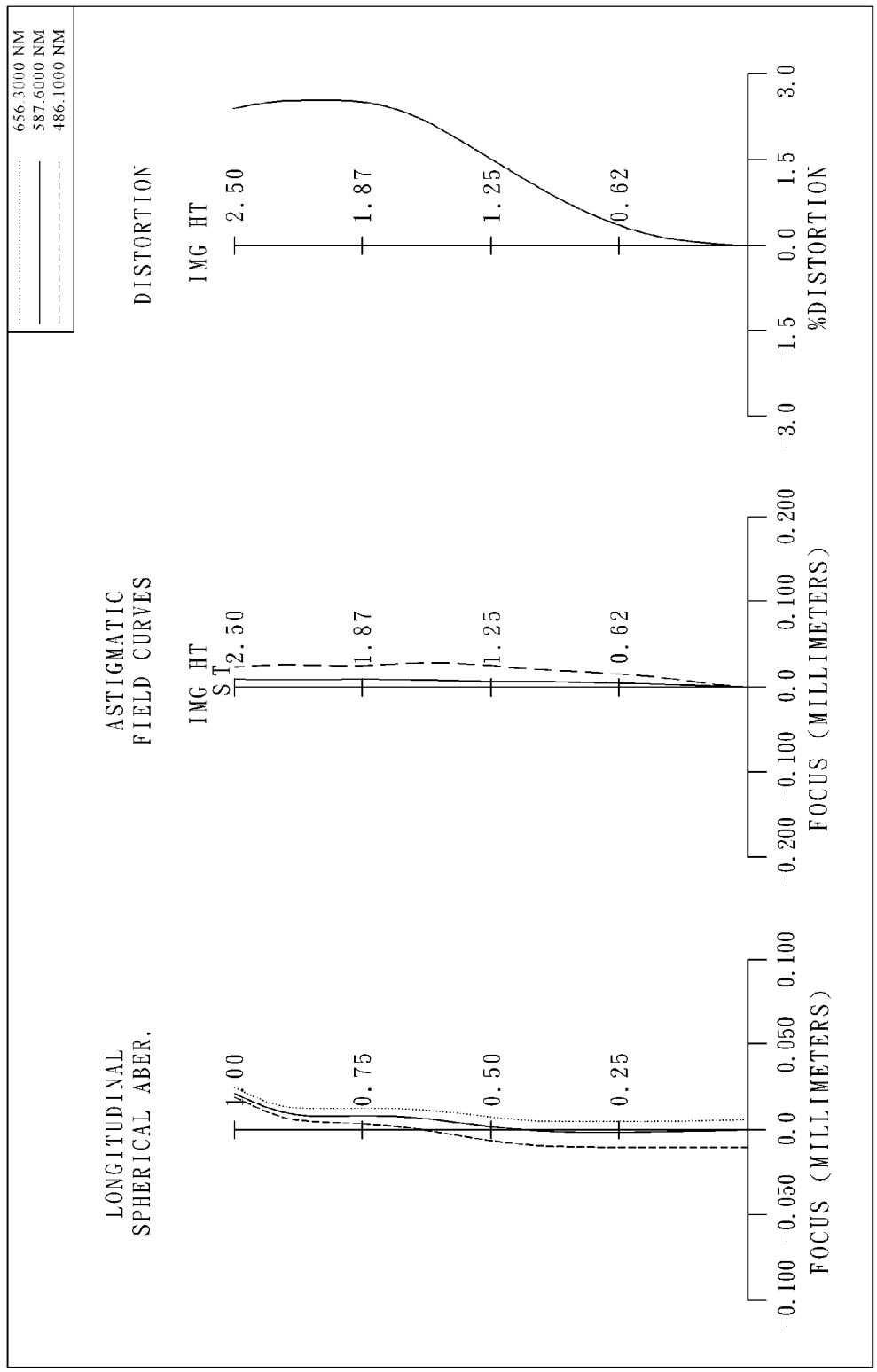
FIG. 2B shows the aberration curves of the second embodiment of the present invention.

FIG. 2A shows an optical lens system in accordance with a second embodiment of the present invention, and FIG. 2B shows the aberration curves of the second embodiment of the present invention. The optical lens system in the second embodiment mainly comprises five lens elements, in order from an object side to an image side: a plastic first lens element 210 with positive refractive power having a convex object-side surface 211 and a convex image-side surface 212, both of the surfaces 211 and 212 being aspheric; a plastic second lens element 220 with negative refractive power having a concave object-side surface 221 and a concave image-side surface 222, both of the surfaces 221 and 222 being aspheric; a plastic third lens element 230 with positive refractive power having a convex object-side surface 231 and a convex image-side surface 232, both of the surfaces 231 and 232 being aspheric; a plastic fourth lens element 240 with positive refractive power having a concave object-side surface 241 and a convex image-side surface 242, both of the surfaces 241 and 242 being aspheric; a plastic fifth lens element 250 with negative refractive power having a concave object-side surface 251 and a concave image-side surface 252, both of the surfaces 251 and 252 being aspheric and at least one inflection point being formed on the image-side surface 252; and a stop 200 disposed between an object and the first lens element 210. The optical lens system further comprises an IR-filter 260 disposed between the image-side surface 252 of the fifth lens element 250 and an image plane 270. The IR-filter 260 is made of glass and has no influence on the focal length of the optical lens system. Moreover, an electronic sensor is disposed at the image plane 270 for image formation of the object.

The equation of the aspheric surface profiles of the second embodiment has the same form as that of the first embodiment.

In the second embodiment of the present optical lens system, the focal length of the optical lens system is f, and it satisfies the relation: f=4.18 (mm).

In the second embodiment of the present optical lens system, the f-number of the optical lens system is Fno, and it satisfies the relation: Fno=2.85.

In the second embodiment of the present optical lens system, half of the maximum field of view of the optical lens system is HFOV, and it satisfies the relation: HFOV=30.4 (degrees).

In the second embodiment of the present optical lens system, the Abbe number of the first lens element 210 is V1, the Abbe number of the second lens element 220 is V2, and they satisfy the relation: V1−V2=32.0.

In the second embodiment of the present optical lens system, the Abbe number of the second lens element 220 is V2, the Abbe number of the third lens element 230 is V3, and they satisfy the relation: |V2−V3−=0.00.

In the second embodiment of the present optical lens system, the thickness of the second lens element 220 on the optical axis is CT2, the focal length of the optical lens system is f, and they satisfy the following relation: CT2/f=0.08.

In the second embodiment of the present optical lens system, the radius of curvature of the object-side surface 211 of the first lens element 210 is R1, the radius of curvature of the image-side surface 212 of the first lens element 210 is R2, and they satisfy the relation: R1/R2=−0.40.

In the second embodiment of the present optical lens system, the radius of curvature of the object-side surface 251 of the fifth lens element 250 is R9, the radius of curvature of the image-side surface 252 of the fifth lens element 250 is R10, and they satisfy the relation: |R10/R9|=0.26.

In the second embodiment of the present optical lens system, the radius of curvature of the object-side surface 241 of the fourth lens element 240 is R7, the radius of curvature of the image-side surface 242 of the fourth lens element 240 is R8, and they satisfy the relation: |(R7+R8)/(R7−R8)|=2.16.

In the second embodiment of the present optical lens system, the focal length of the optical lens system is f, the focal length of the first lens element 210 is f1, and they satisfy the relation: f/f1=1.63.

In the second embodiment of the present optical lens system, the focal length of the optical lens system is f, the focal length of the third lens element 230 is f3, and they satisfy the relation: f/f3=0.16.

In the second embodiment of the present optical lens system, the focal length of the fourth lens element 240 is f4, the focal length of the fifth lens element 250 is f5, and they satisfy the relation: |f4/f5|=1.17.

In the second embodiment of the present optical lens system, the focal length of the optical lens system is f, the focal length of the third lens element 230 is f3, the focal length of the fourth lens element 240 is f4, the focal length of the fifth lens element 250 is f5, and they satisfy the relation: |(f/f3)+(f/f4)+(f/f5)|=0.15.

In the second embodiment of the present optical lens system, the distance on the optical axis between the stop 200 and the electronic sensor is SL, the distance on the optical axis between the object-side surface 211 of the first lens element 210 and the electronic sensor is TTL, and they satisfy the relation: SL/TTL=0.98.

In the second embodiment of the present optical lens system, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=1.97.

The detailed optical data of the second embodiment is shown in FIG. 10 (TABLE 3), and the aspheric surface data is shown in FIG. 11 (TABLE 4), wherein the units of the radius of curvature, the thickness and the focal length are expressed in mm, and HFOV is half of the maximum field of view.

Figure 3A:
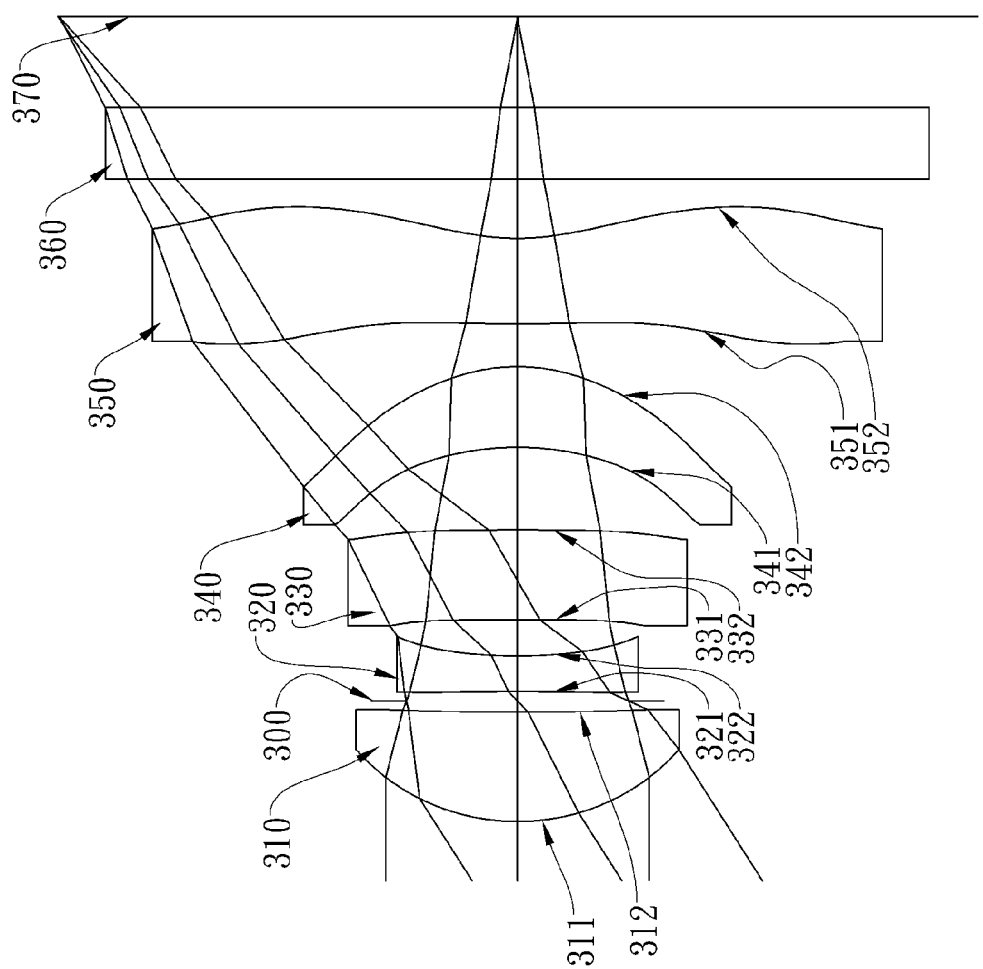
FIG. 3A shows an optical lens system in accordance with a third embodiment of the present invention.
Figure 3B:
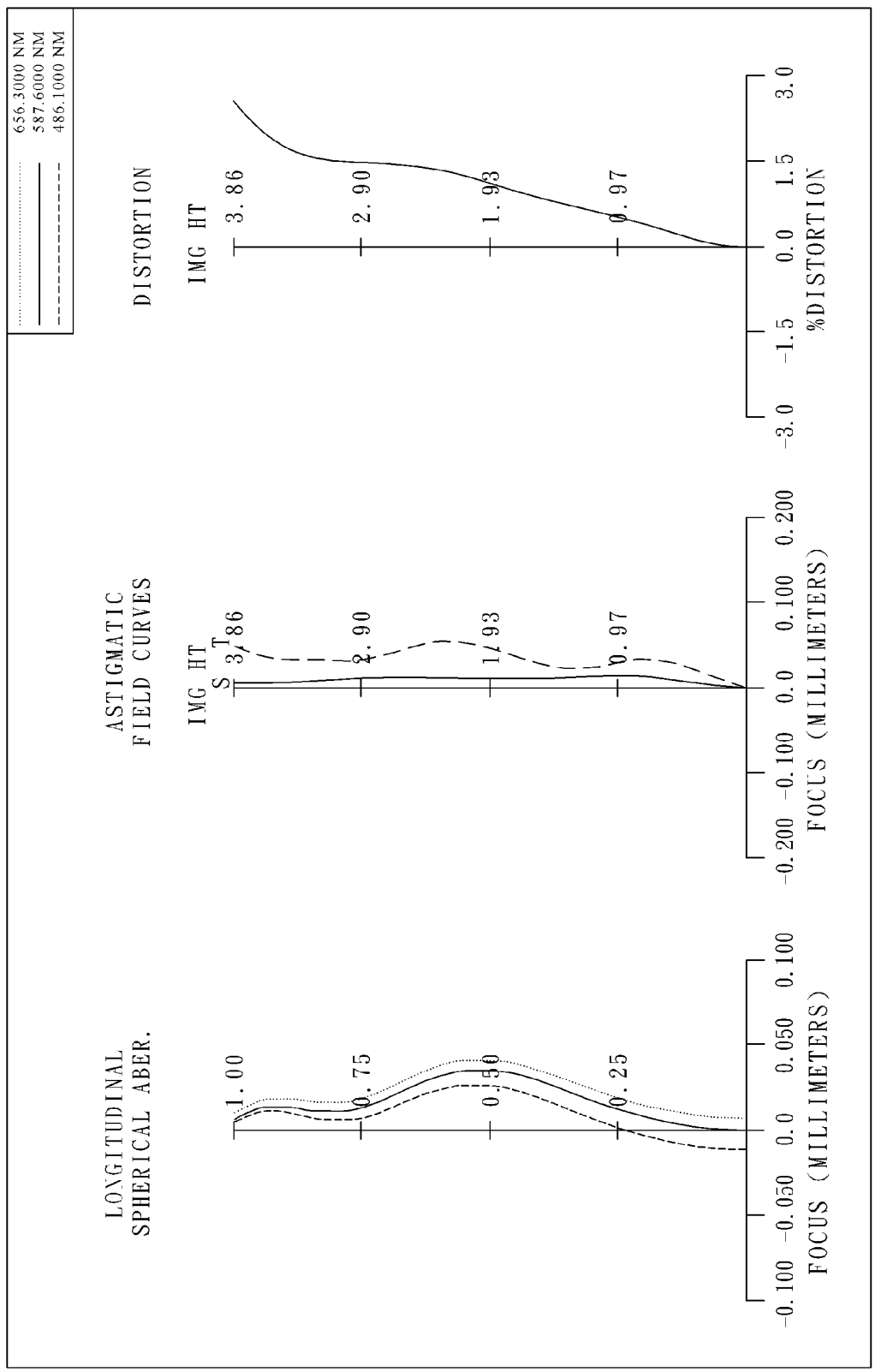
FIG. 3B shows the aberration curves of the third embodiment of the present invention.

FIG. 3A shows an optical lens system in accordance with a third embodiment of the present invention, and FIG. 3B shows the aberration curves of the third embodiment of the present invention. The optical lens system in the third embodiment mainly comprises five lens elements, in order from an object side to an image side: a plastic first lens element 310 with positive refractive power having a convex object-side surface 311 and a concave image-side surface 312, both of the surfaces 311 and 312 being aspheric; a plastic second lens element 320 with negative refractive power having a concave object-side surface 321 and a concave image-side surface 322, both of the surfaces 321 and 322 being aspheric; a plastic third lens element 330 with positive refractive power having a convex object-side surface 331 and a convex image-side surface 332, both of the surfaces 331 and 332 being aspheric; a plastic fourth lens element 340 with positive refractive power having a concave object-side surface 341 and a convex image-side surface 342, both of the surfaces 341 and 342 being aspheric; a plastic fifth lens element 350 with negative refractive power having a convex object-side surface 351 and a concave image-side surface 352, both of the surfaces 351 and 352 being aspheric and at least one inflection point being formed on the image-side surface 352; and a stop 300 disposed between the first lens element 310 and the second lens element 320. The optical lens system further comprises an IR-filter 360 disposed between the image-side surface 352 of the fifth lens element 350 and an image plane 370. The IR-filter 360 is made of glass and has no influence on the focal length of the optical lens system. Moreover, an electronic sensor is disposed at the image plane 370 for image formation of an object.

The equation of the aspheric surface profiles of the third embodiment has the same form as that of the first embodiment.

In the third embodiment of the present optical lens system, the focal length of the optical lens system is f, and it satisfies the relation: f=5.96 (mm).

In the third embodiment of the present optical lens system, the f-number of the optical lens system is Fno, and it satisfies the relation: Fno=2.66.

In the third embodiment of the present optical lens system, half of the maximum field of view of the optical lens system is HFOV, and it satisfies the relation: HFOV=32.5 (degrees).

In the third embodiment of the present optical lens system, the Abbe number of the first lens element 310 is V1, the Abbe number of the second lens element 320 is V2, and they satisfy the relation: V1−V2=32.5.

In the third embodiment of the present optical lens system, the Abbe number of the second lens element 320 is V2, the Abbe number of the third lens element 330 is V3, and they satisfy the relation: |V2−V3|=0.00.

In the third embodiment of the present optical lens system, the thickness of the second lens element 320 on the optical axis is CT2, the focal length of the optical lens system is f, and they satisfy the following relation: CT2/f=0.05.

In the third embodiment of the present optical lens system, the radius of curvature of the object-side surface 311 of the first lens element 310 is R1, the radius of curvature of the image-side surface 312 of the first lens element 310 is R2, and they satisfy the relation: R1/R2=0.03.

In the third embodiment of the present optical lens system, the radius of curvature of the object-side surface 351 of the fifth lens element 350 is R9, the radius of curvature of the image-side surface 352 of the fifth lens element 350 is R10, and they satisfy the relation: |R10/R9|=0.17.

In the third embodiment of the present optical lens system, the radius of curvature of the object-side surface 341 of the fourth lens element 340 is R7, the radius of curvature of the image-side surface 342 of the fourth lens element 340 is R8, and they satisfy the relation: |(R7+R8)/(R7−R8)|=4.18.

In the third embodiment of the present optical lens system, the focal length of the optical lens system is f, the focal length of the first lens element 310 is f1, and they satisfy the relation: f/f1=1.70.

In the third embodiment of the present optical lens system, the focal length of the optical lens system is f, the focal length of the third lens element 330 is f3, and they satisfy the relation: f/f3=0.15.

In the third embodiment of the present optical lens system, the focal length of the fourth lens element 340 is f4, the focal length of the fifth lens element 350 is f5, and they satisfy the relation: |f4/f5|=1.22.

In the third embodiment of the present optical lens system, the focal length of the optical lens system is f, the focal length of the third lens element 330 is f3, the focal length of the fourth lens element 340 is f4, the focal length of the fifth lens element 350 is f5, and they satisfy the relation: |(f/f3)+(f/f4)+(f/f5)|=0.08.

In the third embodiment of the present optical lens system, the distance on the optical axis between the stop 300 and the electronic sensor is SL, the distance on the optical axis between the object-side surface 311 of the first lens element 310 and the electronic sensor is TTL, and they satisfy the relation: SL/TTL=0.85.

In the third embodiment of the present optical lens system, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.70.

The detailed optical data of the third embodiment is shown in FIG. 12 (TABLE 5), and the aspheric surface data is shown in FIG. 13 (TABLE 6), wherein the units of the radius of curvature, the thickness and the focal length are expressed in mm, and HFOV is half of the maximum field of view.

Figure 4A:
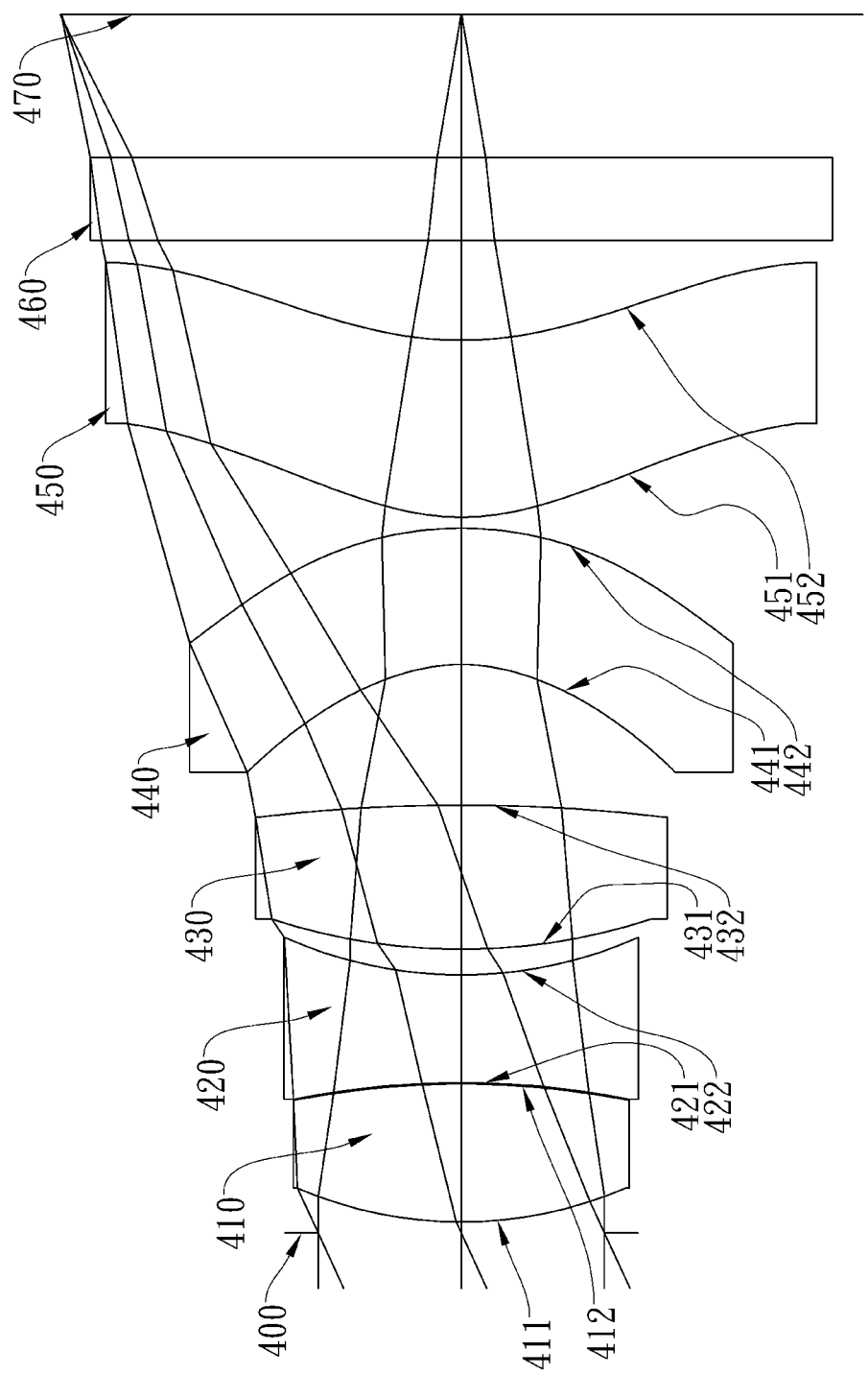
FIG. 4A shows an optical lens system in accordance with a fourth embodiment of the present invention.
Figure 4B:
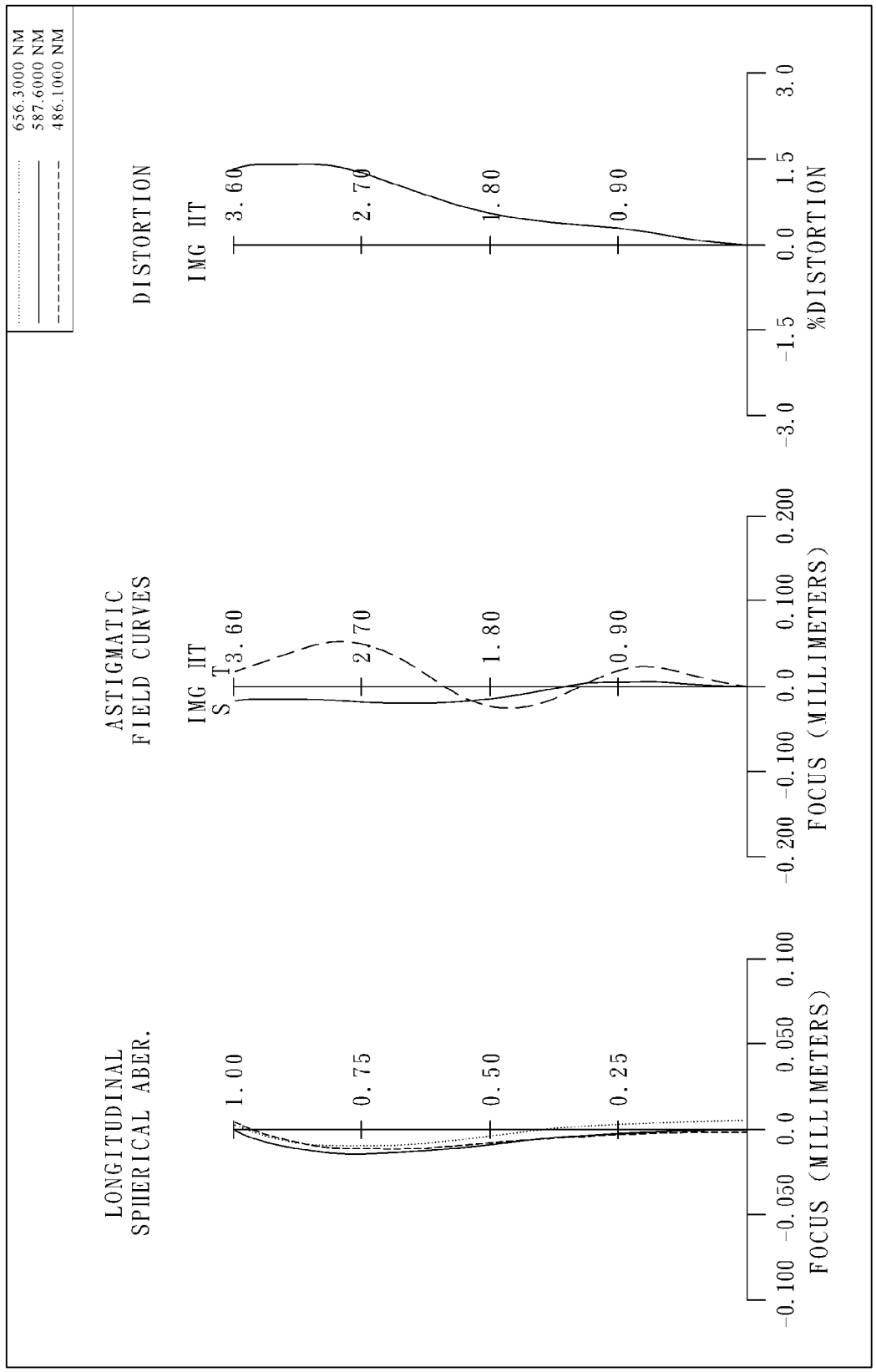
FIG. 4B shows the aberration curves of the fourth embodiment of the present invention.

FIG. 4A shows an optical lens system in accordance with a fourth embodiment of the present invention, and FIG. 4B shows the aberration curves of the fourth embodiment of the present invention. The optical lens system in the fourth embodiment mainly comprises five lens elements, in order from an object side to an image side: a glass first lens element 410 with positive refractive power having a convex object-side surface 411 and a convex image-side surface 412, both of the surfaces 411 and 412 being aspheric; a glass second lens element 420 with negative refractive power having a concave object-side surface 421 and a concave image-side surface 422, both of the surfaces 421 and 422 being aspheric; a glass third lens element 430 with positive refractive power having a convex object-side surface 431 and a convex image-side surface 432, both of the surfaces 431 and 432 being aspheric; a plastic fourth lens element 440 with negative refractive power having a concave object-side surface 441 and a convex image-side surface 442, both of the surfaces 441 and 442 being aspheric; a plastic fifth lens element 450 with positive refractive power having a convex object-side surface 451 and a concave image-side surface 452, both of the surfaces 451 and 452 being aspheric and at least one inflection point being formed on the image-side surface 452; and a stop 400 disposed between an object and the first lens element 410. The optical lens system further comprises an IR-filter 460 disposed between the image-side surface 452 of the fifth lens element 450 and an image plane 470. The IR-filter 460 is made of glass and has no influence on the focal length of the optical lens system. Moreover, an electronic sensor is disposed at the image plane 470 for image formation of the object.

The equation of the aspheric surface profiles of the fourth embodiment has the same form as that of the first embodiment.

In the fourth embodiment of the present optical lens system, the focal length of the optical lens system is f, and it satisfies the relation: f=7.77 (mm).

In the fourth embodiment of the present optical lens system, the f-number of the optical lens system is Fno, and it satisfies the relation: Fno=3.00.

In the fourth embodiment of the present optical lens system, half of the maximum field of view of the optical lens system is HFOV, and it satisfies the relation: HFOV=24.7 (degrees).

In the fourth embodiment of the present optical lens system, the Abbe number of the first lens element 410 is V1, the Abbe number of the second lens element 420 is V2, and they satisfy the relation: V1−V2=6.3.

In the fourth embodiment of the present optical lens system, the Abbe number of the second lens element 420 is V2, the Abbe number of the third lens element 430 is V3, and they satisfy the relation: |V2−V3|=30.90.

In the fourth embodiment of the present optical lens system, the thickness of the second lens element 420 on the optical axis is CT2, the focal length of the optical lens system is f, and they satisfy the following relation: CT2/f=0.13.

In the fourth embodiment of the present optical lens system, the radius of curvature of the object-side surface 411 of the first lens element 410 is R1, the radius of curvature of the image-side surface 412 of the first lens element 410 is R2, and they satisfy the relation: R1/R2=−0.48.

In the fourth embodiment of the present optical lens system, the radius of curvature of the object-side surface 451 of the fifth lens element 450 is R9, the radius of curvature of the image-side surface 452 of the fifth lens element 450 is R10, and they satisfy the relation: |R10/R9|=1.46.

In the fourth embodiment of the present optical lens system, the radius of curvature of the object-side surface 441 of the fourth lens element 440 is R7, the radius of curvature of the image-side surface 442 of the fourth lens element 440 is R8, and they satisfy the relation: |(R7+R8)/(R7−R8)|=3.15.

In the fourth embodiment of the present optical lens system, the focal length of the optical lens system is f, the focal length of the first lens element 410 is f1, and they satisfy the relation: f/f1=2.06.

In the fourth embodiment of the present optical lens system, the focal length of the optical lens system is f, the focal length of the third lens element 430 is f3, and they satisfy the relation: f/f3=1.36.

In the fourth embodiment of the present optical lens system, the focal length of the fourth lens element 440 is f4, the focal length of the fifth lens element 450 is f5, and they satisfy the relation: |f4/f5|=0.95.

In the fourth embodiment of the present optical lens system, the focal length of the optical lens system is f, the focal length of the third lens element 430 is f3, the focal length of the fourth lens element 440 is f4, the focal length of the fifth lens element 450 is f5, and they satisfy the relation: |(f/f3)+(f/f4)+(f/f5)|=1.31.

In the fourth embodiment of the present optical lens system, the distance on the optical axis between the stop 400 and the electronic sensor is SL, the distance on the optical axis between the object-side surface 411 of the first lens element 410 and the electronic sensor is TTL, and they satisfy the relation: SL/TTL=1.01.

In the fourth embodiment of the present optical lens system, the distance on the optical axis between the object-side surface 411 of the first lens element 410 and the electronic sensor is TTL, half of the diagonal length of the effective pixel area of the electronic sensor is ImgH, and they satisfy the relation: TTL/ImgH=2.95.

The detailed optical data of the fourth embodiment is shown in FIG. 14 (TABLE 7), and the aspheric surface data is shown in FIG. 15 (TABLE 8), wherein the units of the radius of curvature, the thickness and the focal length are expressed in mm, and HFOV is half of the maximum field of view.

Figure 5A:
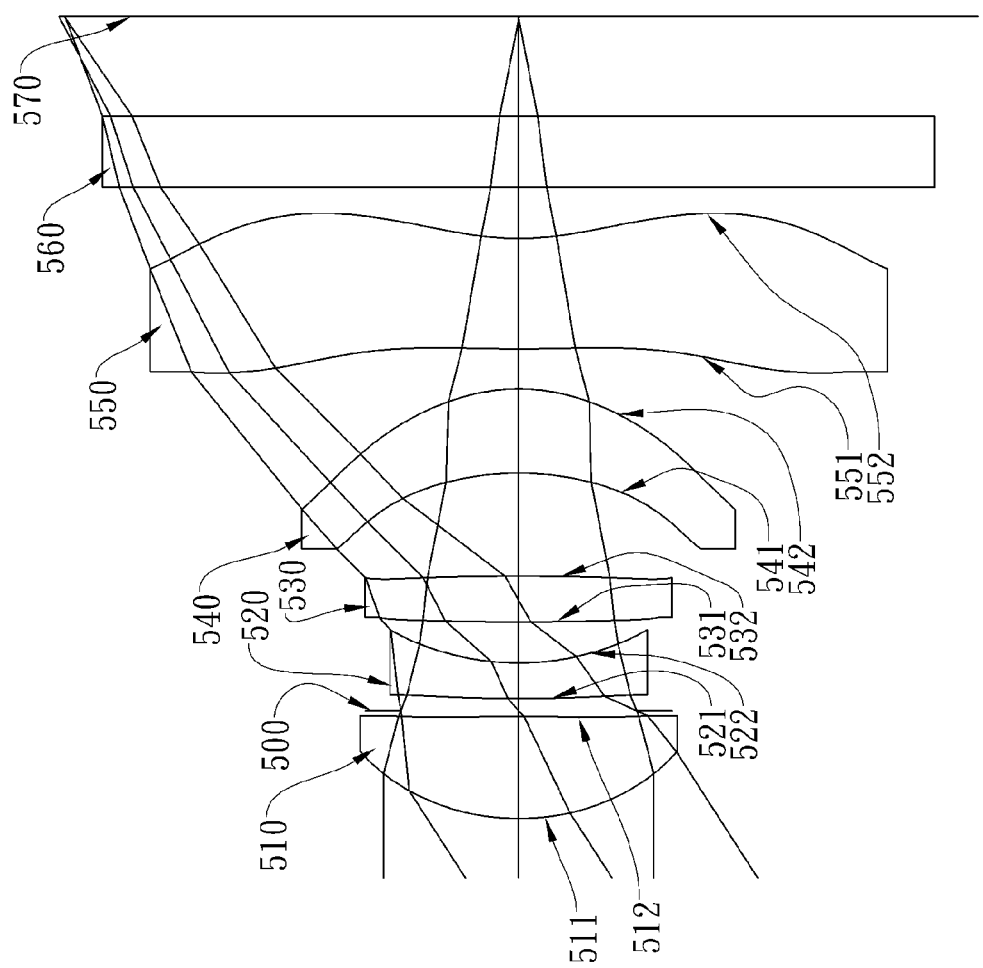
FIG. 5A shows an optical lens system in accordance with a fifth embodiment of the present invention.
Figure 5B:
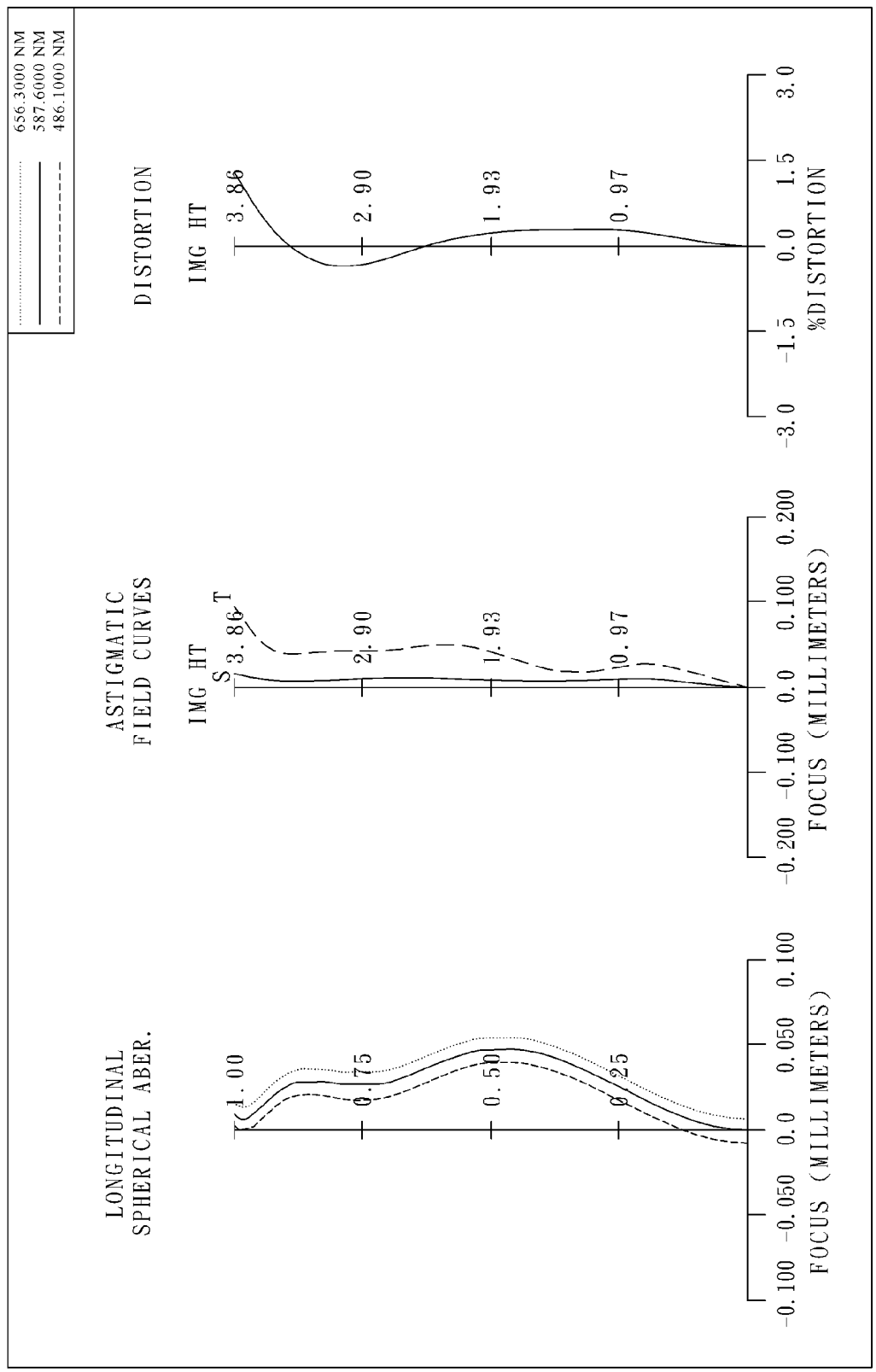
FIG. 5B shows the aberration curves of the fifth embodiment of the present invention.

FIG. 5A shows an optical lens system in accordance with a fifth embodiment of the present invention, and FIG. 5B shows the aberration curves of the fifth embodiment of the present invention. The optical lens system in the fifth embodiment mainly comprises five lens elements, in order from an object side to an image side: a plastic first lens element 510 with positive refractive power having a convex object-side surface 511 and a convex image-side surface 512, both of the surfaces 511 and 512 being aspheric; a plastic second lens element 520 with negative refractive power having a convex object-side surface 521 and a concave image-side surface 522, both of the surfaces 521 and 522 being aspheric; a plastic third lens element 530 with positive refractive power having a convex object-side surface 531 and a convex image-side surface 532, both of the surfaces 531 and 532 being aspheric; a plastic fourth lens element 540 with positive refractive power having a concave object-side surface 541 and a convex image-side surface 542, both of the surfaces 541 and 542 being aspheric; a plastic fifth lens element 550 with negative refractive power having a convex object-side surface 551 and a concave image-side surface 552, both of the surfaces 551 and 552 being aspheric and at least one inflection point being formed on the image-side surface 552; and a stop 500 disposed between the first lens element 510 and the second lens element 520. The optical lens system further comprises an IR-filter 560 disposed between the image-side surface 552 of the fifth lens element 550 and an image plane 570. The IR-filter 560 is made of glass and has no influence on the focal length of the optical lens system. Moreover, an electronic sensor is disposed at the image plane 570 for image formation of an object.

The equation of the aspheric surface profiles of the fifth embodiment has the same form as that of the first embodiment.

In the fifth embodiment of the present optical lens system, the focal length of the optical lens system is f, and it satisfies the relation: f=5.99 (mm).

In the fifth embodiment of the present optical lens system, the f-number of the optical lens system is Fno, and it satisfies the relation: Fno=2.60.

In the fifth embodiment of the present optical lens system, half of the maximum field of view of the optical lens system is HFOV, and it satisfies the relation: HFOV=32.7 (degrees).

In the fifth embodiment of the present optical lens system, the Abbe number of the first lens element 510 is V1, the Abbe number of the second lens element 520 is V2, and they satisfy the relation: V1−V2=32.1.

In the fifth embodiment of the present optical lens system, the Abbe number of the second lens element 520 is V2, the Abbe number of the third lens element 530 is V3, and they satisfy the relation: |V2−V3|=0.41.

In the fifth embodiment of the present optical lens system, the thickness of the second lens element 520 on the optical axis is CT2, the focal length of the optical lens system is f, and they satisfy the following relation: CT2/f=0.05.

In the fifth embodiment of the present optical lens system, the radius of curvature of the object-side surface 511 of the first lens element 510 is R1, the radius of curvature of the image-side surface 512 of the first lens element 510 is R2, and they satisfy the relation: R1/R2=−0.09.

In the fifth embodiment of the present optical lens system, the radius of curvature of the object-side surface 551 of the fifth lens element 550 is R9, the radius of curvature of the image-side surface 552 of the fifth lens element 550 is R10, and they satisfy the relation: |R10/R9|=0.17.

In the fifth embodiment of the present optical lens system, the radius of curvature of the object-side surface 541 of the fourth lens element 540 is R7, the radius of curvature of the image-side surface 542 of the fourth lens element 540 is R8, and they satisfy the relation: |(R7+R8)/(R7−R8)|=4.76.

In the fifth embodiment of the present optical lens system, the focal length of the optical lens system is f, the focal length of the first lens element 510 is f1, and they satisfy the relation: f/f1=1.80.

In the fifth embodiment of the present optical lens system, the focal length of the optical lens system is f, the focal length of the third lens element 530 is f3, and they satisfy the relation: f/f3=0.35.

In the fifth embodiment of the present optical lens system, the focal length of the fourth lens element 540 is f4, the focal length of the fifth lens element 550 is f5, and they satisfy the relation: |f4/f5|=1.23.

In the fifth embodiment of the present optical lens system, the focal length of the optical lens system is f, the focal length of the third lens element 530 is f3, the focal length of the fourth lens element 540 is f4, the focal length of the fifth lens element 550 is f5, and they satisfy the relation: |(f/f3)+(f/f4)+(f/f5)|=0.14.

In the fifth embodiment of the present optical lens system, the distance on the optical axis between the stop 500 and the electronic sensor is SL, the distance on the optical axis between the object-side surface 511 of the first lens element 510 and the electronic sensor is TTL, and they satisfy the relation: SL/TTL=0.86.

In the fifth embodiment of the present optical lens system, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=1.69.

The detailed optical data of the fifth embodiment is shown in FIG. 16 (TABLE 9), and the aspheric surface data is shown in FIG. 17 (TABLE 10), wherein the units of the radius of curvature, the thickness and the focal length are expressed in mm, and HFOV is half of the maximum field of view.

Figure 6A:
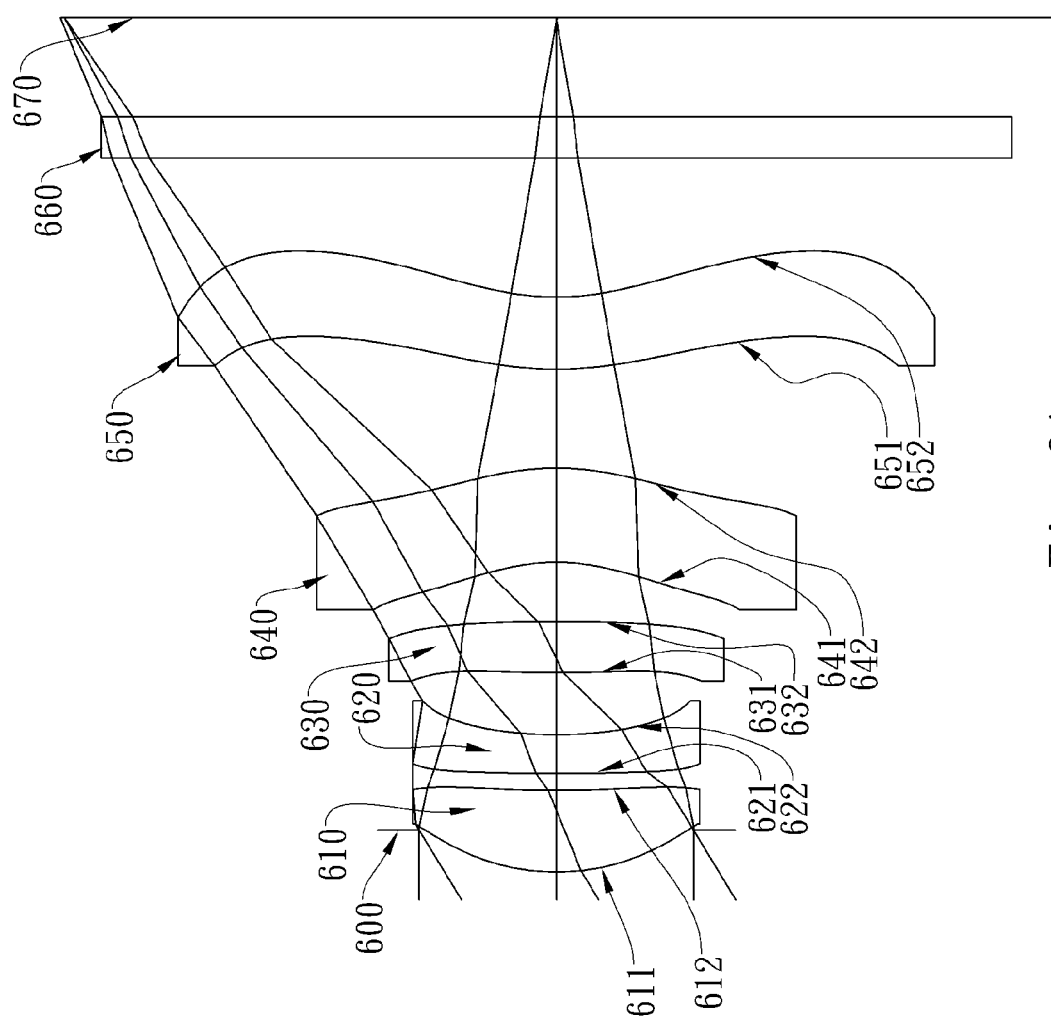
FIG. 6A shows an optical lens system in accordance with a sixth embodiment of the present invention.
Figure 6B:
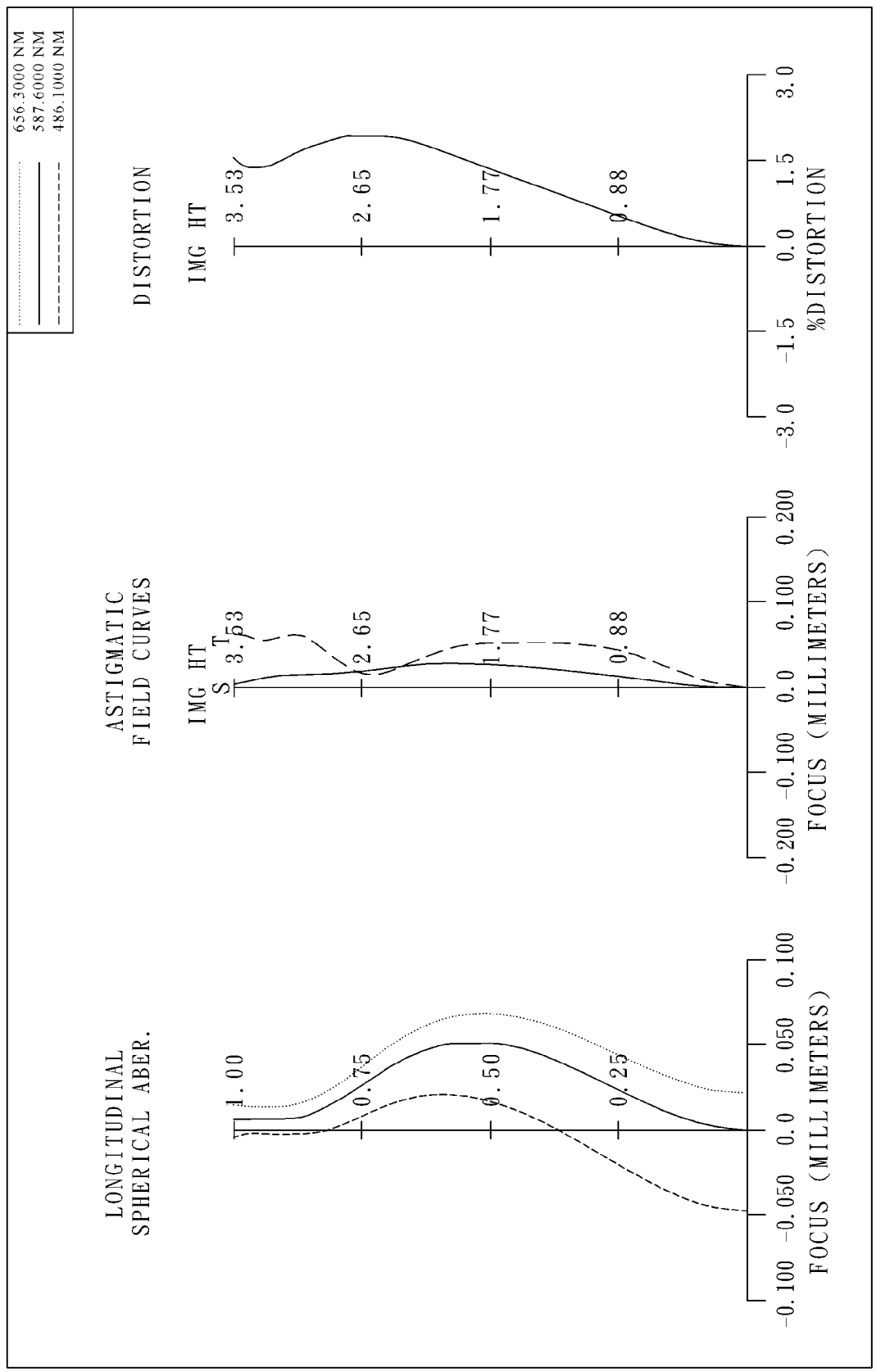
FIG. 6B shows the aberration curves of the sixth embodiment of the present invention.

FIG. 6A shows an optical lens system in accordance with a sixth embodiment of the present invention, and FIG. 6B shows the aberration curves of the sixth embodiment of the present invention. The optical lens system in the sixth embodiment mainly comprises five lens elements, in order from an object side to an image side: a plastic first lens element 610 with positive refractive power having a convex object-side surface 611 and a concave image-side surface 612, both of the surfaces 611 and 612 being aspheric; a plastic second lens element 620 with negative refractive power having a convex object-side surface 621 and a concave image-side surface 622, both of the surfaces 621 and 622 being aspheric; a plastic third lens element 630 with positive refractive power having a convex object-side surface 631 and a convex image-side surface 632, both of the surfaces 631 and 632 being aspheric; a plastic fourth lens element 640 with negative refractive power having a concave object-side surface 641 and a convex image-side surface 642, both of the surfaces 641 and 642 being aspheric; a plastic fifth lens element 650 with negative refractive power having a convex object-side surface 651 and a concave image-side surface 652, both of the surfaces 651 and 652 being aspheric and at least one inflection point being formed on the image-side surface 652; and a stop 600 disposed between an object and the first lens element 610. The optical lens system further comprises an IR-filter 660 disposed between the image-side surface 652 of the fifth lens element 650 and an image plane 670. The IR-filter 660 is made of glass and has no influence on the focal length of the optical lens system. Moreover, an electronic sensor is disposed at the image plane 670 for image formation of the object.

The equation of the aspheric surface profiles of the sixth embodiment has the same form as that of the first embodiment.

In the sixth embodiment of the present optical lens system, the focal length of the optical lens system is f, and it satisfies the relation: f=5.77 (mm).

In the sixth embodiment of the present optical lens system, the f-number of the optical lens system is Fno, and it satisfies the relation: Fno=2.90.

In the sixth embodiment of the present optical lens system, half of the maximum field of view of the optical lens system is HFOV, and it satisfies the relation: HFOV=31.3 (degrees).

In the sixth embodiment of the present optical lens system, the Abbe number of the first lens element 610 is V1, the Abbe number of the second lens element 620 is V2, and they satisfy the relation: V1−V2=32.0.

In the sixth embodiment of the present optical lens system, the Abbe number of the second lens element 620 is V2, the Abbe number of the third lens element 630 is V3, and they satisfy the relation: |V2−V3|=0.00.

In the sixth embodiment of the present optical lens system, the thickness of the second lens element 620 on the optical axis is CT2, the focal length of the optical lens system is f, and they satisfy the following relation: CT2/f=0.05.

In the sixth embodiment of the present optical lens system, the radius of curvature of the object-side surface 611 of the first lens element 610 is R1, the radius of curvature of the image-side surface 612 of the first lens element 610 is R2, and they satisfy the relation: R1/R2=0.21.

In the sixth embodiment of the present optical lens system, the radius of curvature of the object-side surface 651 of the fifth lens element 650 is R9, the radius of curvature of the image-side surface 652 of the fifth lens element 650 is R10, and they satisfy the relation: |R10/R9|=0.71.

In the sixth embodiment of the present optical lens system, the radius of curvature of the object-side surface 641 of the fourth lens element 640 is R7, the radius of curvature of the image-side surface 642 of the fourth lens element 640 is R8, and they satisfy the relation: |(R7+R8)/(R7−R8)|=7.80.

In the sixth embodiment of the present optical lens system, the focal length of the optical lens system is f, the focal length of the first lens element 610 is f1, and they satisfy the relation: f/f1=1.63.

In the sixth embodiment of the present optical lens system, the focal length of the optical lens system is f, the focal length of the third lens element 630 is f3, and they satisfy the relation: f/f3=0.68.

In the sixth embodiment of the present optical lens system, the focal length of the fourth lens element 640 is f4, the focal length of the fifth lens element 650 is f5, and they satisfy the relation: |f4/f5|=1.80.

In the sixth embodiment of the present optical lens system, the focal length of the optical lens system is f, the focal length of the third lens element 630 is f3, the focal length of the fourth lens element 640 is f4, the focal length of the fifth lens element 650 is f5, and they satisfy the relation: |(f/f3)+(f/f4)+(f/f5)|=0.07.

In the sixth embodiment of the present optical lens system, the distance on the optical axis between the stop 600 and the electronic sensor is SL, the distance on the optical axis between the object-side surface 611 of the first lens element 610 and the electronic sensor is TTL, and they satisfy the relation: SL/TTL=0.95.

In the sixth embodiment of the present optical lens system, the distance on the optical axis between the object-side surface 611 of the first lens element 610 and the electronic sensor is TTL, half of the diagonal length of the effective pixel area of the electronic sensor is ImgH, and they satisfy the relation: TTL/ImgH=1.71.

The detailed optical data of the sixth embodiment is shown in FIG. 18 (TABLE 11), and the aspheric surface data is shown in FIG. 19 (TABLE 12), wherein the units of the radius of curvature, the thickness and the focal length are expressed in mm, and HFOV is half of the maximum field of view.

Figure 7A:
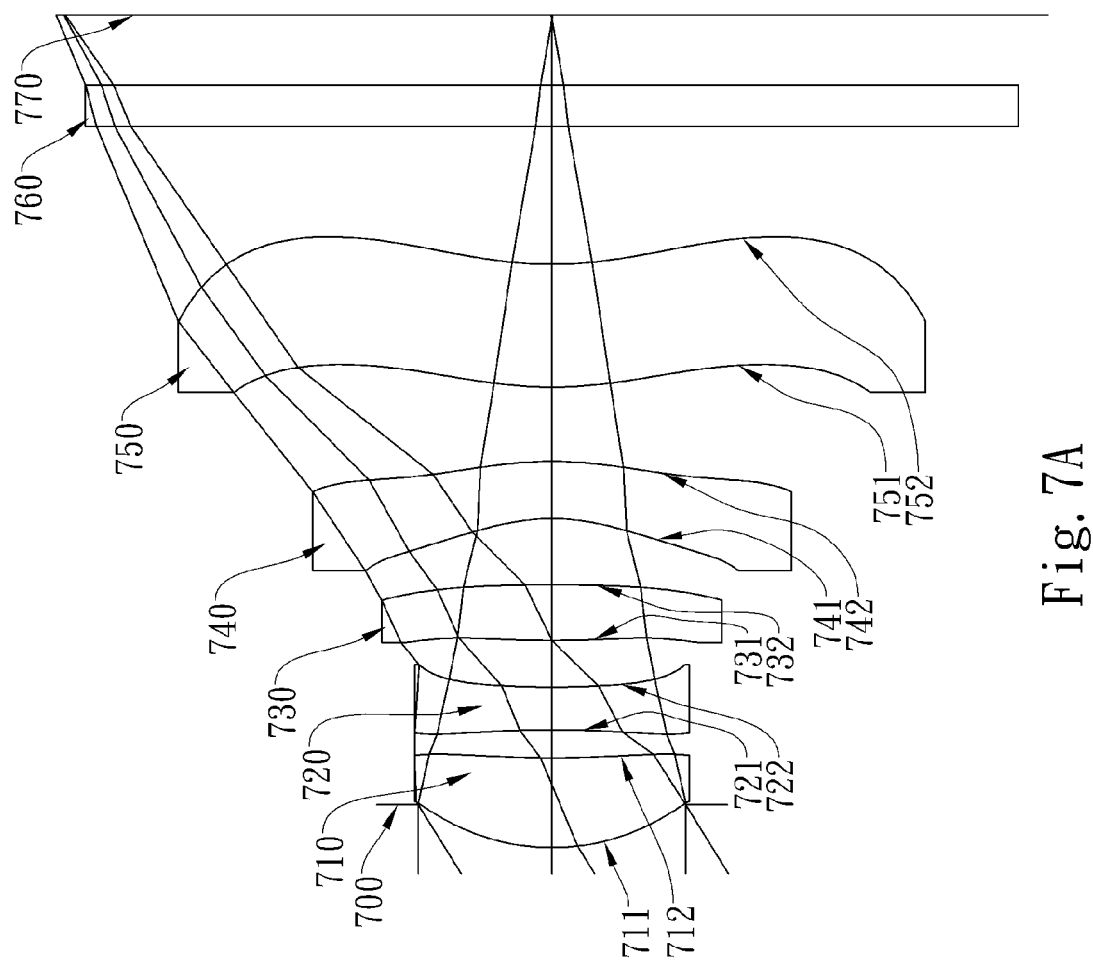
FIG. 7A shows an optical lens system in accordance with a seventh embodiment of the present invention.
Figure 7B:
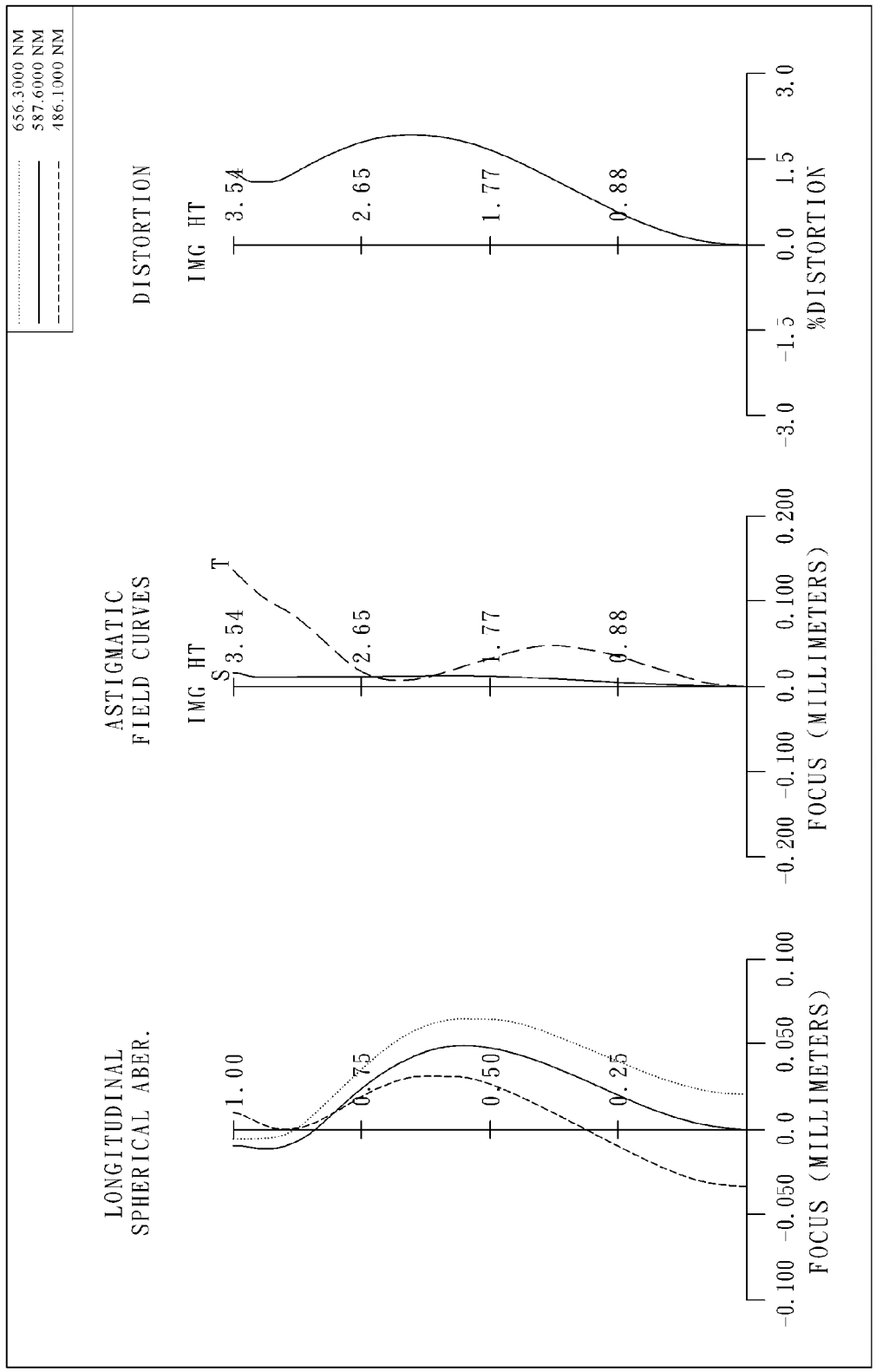
FIG. 7B shows the aberration curves of the seventh embodiment of the present invention.

FIG. 7A shows an optical lens system in accordance with a seventh embodiment of the present invention, and FIG. 7B shows the aberration curves of the seventh embodiment of the present invention. The optical lens system in the seventh embodiment mainly comprises five lens elements, in order from an object side to an image side: a plastic first lens element 710 with positive refractive power having a convex object-side surface 711 and a concave image-side surface 712, both of the surfaces 711 and 712 being aspheric; a plastic second lens element 720 with negative refractive power having a concave object-side surface 721 and a concave image-side surface 722, both of the surfaces 721 and 722 being aspheric; a plastic third lens element 730 with positive refractive power having a convex object-side surface 731 and a convex image-side surface 732, both of the surfaces 731 and 732 being aspheric; a plastic fourth lens element 740 with negative refractive power having a concave object-side surface 741 and a convex image-side surface 742, both of the surfaces 741 and 742 being aspheric; a plastic fifth lens element 750 with positive refractive power having a convex object-side surface 751 and a concave image-side surface 752, both of the surfaces 751 and 752 being aspheric and at least one inflection point being formed on the image-side surface 752; and a stop 700 disposed between an object and the first lens element 710. The optical lens system further comprises an IR-filter 760 disposed between the image-side surface 752 of the fifth lens element 750 and an image plane 770. The IR-filter 760 is made of glass and has no influence on the focal length of the optical lens system. Moreover, an electronic sensor is disposed at the image plane 770 for image formation of the object.

The equation of the aspheric surface profiles of the seventh embodiment has the same form as that of the first embodiment.

In the seventh embodiment of the present optical lens system, the focal length of the optical lens system is f, and it satisfies the relation: f=5.68 (mm).

In the seventh embodiment of the present optical lens system, the f-number of the optical lens system is Fno, and it satisfies the relation: Fno=2.90.

In the seventh embodiment of the present optical lens system, half of the maximum field of view of the optical lens system is HFOV, and it satisfies the relation: HFOV=31.8 (degrees).

In the seventh embodiment of the present optical lens system, the Abbe number of the first lens element 710 is V1, the Abbe number of the second lens element 720 is V2, and they satisfy the relation: V1−V2=34.5.

In the seventh embodiment of the present optical lens system, the Abbe number of the second lens element 720 is V2, the Abbe number of the third lens element 730 is V3, and they satisfy the relation: |V2−V3|=2.46.

In the seventh embodiment of the present optical lens system, the thickness of the second lens element 720 on the optical axis is CT2, the focal length of the optical lens system is f, and they satisfy the following relation: CT2/f=0.05.

In the seventh embodiment of the present optical lens system, the radius of curvature of the object-side surface 711 of the first lens element 710 is R1, the radius of curvature of the image-side surface 712 of the first lens element 710 is R2, and they satisfy the relation: R1/R2=0.22.

In the seventh embodiment of the present optical lens system, the radius of curvature of the object-side surface 751 of the fifth lens element 750 is R9, the radius of curvature of the image-side surface 752 of the fifth lens element 750 is R10, and they satisfy the relation: |R10/R9|=0.96.

In the seventh embodiment of the present optical lens system, the radius of curvature of the object-side surface 741 of the fourth lens element 740 is R7, the radius of curvature of the image-side surface 742 of the fourth lens element 740 is R8, and they satisfy the relation: |(R7+R8)/(R7−R8)|=3.40.

In the seventh embodiment of the present optical lens system, the focal length of the optical lens system is f, the focal length of the first lens element 710 is f1, and they satisfy the relation: f/f1=1.60.

In the seventh embodiment of the present optical lens system, the focal length of the optical lens system is f, the focal length of the third lens element 730 is f3, and they satisfy the relation: f/f3=0.80.

In the seventh embodiment of the present optical lens system, the focal length of the fourth lens element 740 is f4, the focal length of the fifth lens element 750 is f5, and they satisfy the relation: |f4/f5|=0.10.

In the seventh embodiment of the present optical lens system, the focal length of the optical lens system is f, the focal length of the third lens element 730 is f3, the focal length of the fourth lens element 740 is f4, the focal length of the fifth lens element 750 is f5, and they satisfy the relation: |(f/f3)+(f/f4)+(f/f5)|=0.05.

In the seventh embodiment of the present optical lens system, the distance on the optical axis between the stop 700 and the electronic sensor is SL, the distance on the optical axis between the object-side surface 711 of the first lens element 710 and the electronic sensor is TTL, and they satisfy the relation: SL/TTL=0.95.

In the seventh embodiment of the present optical lens system, the distance on the optical axis between the object-side surface 711 of the first lens element 710 and the electronic sensor is TTL, half of the diagonal length of the effective pixel area of the electronic sensor is ImgH, and they satisfy the relation: TTL/ImgH=1.68.

The detailed optical data of the seventh embodiment is shown in FIG. 20 (TABLE 13), and the aspheric surface data is shown in FIG. 21 (TABLE 14), wherein the units of the radius of curvature, the thickness and the focal length are expressed in mm, and HFOV is half of the maximum field of view.

It is to be noted that TABLES 1-14 (illustrated in FIGS. 8-21 respectively) show different data of the different embodiments; however, the data of the different embodiments are obtained from experiments. Therefore, any optical lens system of the same structure is considered to be within the scope of the present invention even if it uses different data. The preferred embodiments depicted above are exemplary and are not intended to limit the scope of the present invention. TABLE 15 (illustrated in FIG. 22) shows the data of the respective embodiments resulting from the equations.

What is claimed is:

1. An optical lens system comprising, in order from an object side to an image side:
    a first lens element with positive refractive power having a convex object-side surface;
    a second lens element with negative refractive power;
    a third lens element with positive refractive power having a convex object-side surface and a convex image-side surface;
    a fourth lens element; and
    a fifth lens element having a convex object-side surface and a concave image-side surface, the object-side and image-side surfaces thereof being aspheric and at least one inflection point being formed on the image-side surface,
    wherein the optical lens system is further provided with a stop disposed between an object and the third lens element, and an electronic sensor disposed at an image plane for the image formation of the object; a focal length of the optical lens system is f; a focal length of the third lens element is f3; a distance on an optical axis between the stop and the electronic sensor is SL; a distance on the optical axis between the object-side surface of the first lens element and the electronic sensor is TTL; and they satisfy the following relations:

$0.00 < f/f3 < 1.90$, and $0.7 < SL/TTL < 1.2$.

2. The optical lens system according to claim 1, wherein the fourth lens element has a concave object-side surface and a convex image-side surface, at least one of the object-side and image-side surfaces of the fourth lens element is aspheric, and the fifth lens element is made of plastic.

3. The optical lens system according to claim 2, wherein the second lens element has a concave image-side surface.

4. The optical lens system according to claim 3, wherein the focal length of the optical lens system is f, a focal length of the first lens element is f1, and they satisfy the following relation:

$1.00 < f/f1 < 2.30$.

5. The optical lens system according to claim 4, wherein the focal length of the optical lens system is f, the focal length of the first lens element is f1, and they satisfy the following relation:

$1.30 < f/f1 < 2.00$.

6. The optical lens system according to claim 3, wherein the focal length of the optical lens system is f, the focal length of the third lens element is f3, and they satisfy the following relation:

$0.00 < f/f3 < 0.80$.

7. The optical lens system according to claim 3, wherein an Abbe number of the first lens element is V1, an Abbe number of the second lens element is V2, and they satisfy the following relation:

$28.0 < V1 - V2 < 42.0$.

8. The optical lens system according to claim 1, wherein an Abbe number of the second lens element is V2, an Abbe number of the third lens element is V3, and they satisfy the following relation:

$|V2 - V3| < 12.0$.

9. The optical lens system according to claim 3, wherein a thickness of the second lens element on the optical axis is CT2, the focal length of the optical lens system is f, and they satisfy the following relation:

$0.02 < CT2/f < 0.15$.

10. The optical lens system according to claim 3, wherein a radius of curvature of the object-side surface of the first lens element is R1, a radius of curvature of the image-side surface of the first lens element is R2, and they satisfy the following relation:

$-0.80 < R1/R2 < 0.50$.

11. The optical lens system according to claim 3, wherein a radius of curvature of the object-side surface of the fifth lens element is R9, a radius of curvature of the image-side surface of the fifth lens element is R10, and they satisfy the following relation:

$|R10/R9| < 1.3$.

12. The optical lens system according to claim 11, wherein the radius of curvature of the object-side surface of the fifth lens element is R9, the radius of curvature of the image-side surface of the fifth lens element is R10, and they satisfy the following relation:

$$|R10/R9|<0.8.$$

13. The optical lens system according to claim 2, wherein the focal length of the optical lens system is f, the focal length of the third lens element is f3, a focal length of the fourth lens element is f4, a focal length of the fifth lens element is f5, and they satisfy the following relation:

$$|(f/f3)+(f/f4)+(f/f5)|<0.5.$$

14. The optical lens system according to claim 3, wherein the second lens element has a concave object-side surface.

15. The optical lens system according to claim 3, wherein the distance on the optical axis between the stop and the electronic sensor is SL, the distance on the optical axis between the object-side surface of the first lens element and the electronic sensor is TTL, and they satisfy the following relation:

$$0.8<SL/TTL<0.98.$$

16. The optical lens system according to claim 1, wherein the distance on the optical axis between the object-side surface of the first lens element and the electronic sensor is TTL, half of a diagonal length of an effective pixel area of the electronic sensor is ImgH, and they satisfy the following relation:

$$TTL/ImgH<2.10.$$

17. An optical lens system comprising, in order from an object side to an image side:
   a first lens element with positive refractive power having a convex object-side surface;
   a second lens element with negative refractive power;
   a third lens element with positive refractive power having a convex object-side surface and a convex image-side surface;
   a fourth lens element with positive refractive power; and
   a fifth lens element with negative refractive power having a convex object-side surface and a concave image-side surface, both of the object-side and image-side surfaces thereof being aspheric and at least one inflection point being formed on the image-side surface,
   wherein the optical lens system is further provided with a stop disposed between an object and the third lens element, and an electronic sensor disposed at an image plane for the image formation of the object; a focal length of the optical lens system is f; a focal length of the first lens element is f1; a distance on an optical axis between the stop and the electronic sensor is SL; a distance on the optical axis between the object-side surface of the first lens element and the electronic sensor is TTL; and they satisfy the following relations:

$$1.00<f/f1<2.30,\text{ and}$$

$$0.7<SL/TTL<1.2.$$

18. The optical lens system according to claim 17, wherein the fourth lens element has a concave image-side surface and a convex image-side surface, at least one of the object-side and image-side surfaces of the fourth lens element is aspheric, and the fifth lens element is made of plastic.

19. The optical lens system according to claim 18, wherein the focal length of the optical lens system is f, the focal length of the first lens element is f1, and they satisfy the following relation:

$$1.30<f/f1<2.00.$$

20. The optical lens system according to claim 18, wherein the focal length of the optical lens system is f, a focal length of the third lens element is f3, and they satisfy the following relation:

$$0.00<f/f3<0.80.$$

21. The optical lens system according to claim 18, wherein an Abbe number of the first lens element is V1, an Abbe number of the second lens element is V2, and they satisfy the following relation:

$$28.0<V1-V2<42.0.$$

22. The optical lens system according to claim 18, wherein a focal length of the fourth lens element is f4, a focal length of the fifth lens element is f5, and they satisfy the following relation:

$$0.4<|f4/f5|<1.6.$$

23. The optical lens system according to claim 18, wherein the focal length of the optical lens system is f, a focal length of the third lens element is f3, a focal length of the fourth lens element is f4, a focal length of the fifth lens element is f5, and they satisfy the following relation:

$$|(f/f3)+(f/f4)+(f/f5)|<0.5.$$

24. The optical lens system according to claim 18, wherein the distance on the optical axis between the stop and the electronic sensor is SL, the distance on the optical axis between the object-side surface of the first lens element and the electronic sensor is TTL, and they satisfy the following relation:

$$0.8<SL/TTL<0.98.$$

25. The optical lens system according to claim 18, wherein a radius of curvature of the object-side surface of the fifth lens element is R9, a radius of curvature of the image-side surface of the fifth lens element is R10, and they satisfy the following relation:

$$|R10/R9|<0.8.$$

26. The optical lens system according to claim 17, wherein the second lens element has a concave object-side surface and a concave image-side surface.

27. The optical lens system according to claim 17, wherein the distance on the optical axis between the object-side surface of the first lens element and the electronic sensor is TTL, half of a diagonal length of an effective pixel area of the electronic sensor is ImgH, and they satisfy the following relation:

$$TTL/ImgH<2.10.$$

* * * * *